United States Patent
Inaba et al.

(10) Patent No.: US 9,349,511 B2
(45) Date of Patent: May 24, 2016

(54) COMPOSITE MATERIAL, REACTOR-USE CORE, REACTOR, CONVERTER, AND POWER CONVERTER APPARATUS

(75) Inventors: Kazuhiro Inaba, Osaka (JP); Toru Maeda, Itami (JP)

(73) Assignee: SUMITOMO ELECTRIC INDUSTRIES, LTD., Osaka-shi (JP)

( * ) Notice: Subject to any disclaimer, the term of this patent is extended or adjusted under 35 U.S.C. 154(b) by 0 days.

(21) Appl. No.: 13/977,479

(22) PCT Filed: Mar. 7, 2012

(86) PCT No.: PCT/JP2012/055785
§ 371 (c)(1),
(2), (4) Date: Jun. 28, 2013

(87) PCT Pub. No.: WO2012/128037
PCT Pub. Date: Sep. 27, 2012

(65) Prior Publication Data
US 2013/0286703 A1    Oct. 31, 2013

(30) Foreign Application Priority Data

Mar. 24, 2011  (JP) ................................. 2011-066488
Feb. 3, 2012   (JP) ................................. 2012-022329

(51) Int. Cl.
*H01F 27/24* (2006.01)
*H01F 1/01* (2006.01)
(Continued)

(52) U.S. Cl.
CPC .. *H01F 1/01* (2013.01); *H01F 1/26* (2013.01); *H01F 5/00* (2013.01); *H01F 27/24* (2013.01); *H01F 27/255* (2013.01); *H02M 7/48* (2013.01)

(58) Field of Classification Search
CPC ..................... H01F 5/00; H01F 27/00–27/36

USPC ............................. 336/65, 83, 200, 232–235
See application file for complete search history.

(56) References Cited

U.S. PATENT DOCUMENTS 6,063,209 A    5/2000  Matsutani et al.
7,371,271 B2 *  5/2008  Igarashi et al. ................. 75/246
(Continued)

FOREIGN PATENT DOCUMENTS

CN    1198577 A    11/1998
CN    1321991 A    11/2001
(Continued)

OTHER PUBLICATIONS

International Search Report in PCT International Patent Application No. PCT/JP2012/055785, dated Jun. 19, 2012.
(Continued)

*Primary Examiner* — Tuyen Nguyen
(74) *Attorney, Agent, or Firm* — Venable LLP; Michael A. Sartori

(57) ABSTRACT

A reactor 1 of the present invention includes a coil 2 and a magnetic core 3 disposed inside and outside the coil 2 to form a closed magnetic path. At least part of the magnetic core 3 is made of a composite material containing a magnetic substance powder and a resin containing the powder being dispersed therein. The magnetic substance powder contains powders respectively made of a plurality of materials differing in the relative permeability, representatively, a pure iron powder and an iron alloy powder. Thanks to provision of the magnetic core 3 made of the composite material containing magnetic substance powders made of different types of materials, the reactor 1 achieves both a high saturation magnetic flux density and a low-loss characteristic.

15 Claims, 5 Drawing Sheets

(51) Int. Cl.
  *H01F 5/00* (2006.01)
  *H01F 1/26* (2006.01)
  *H01F 27/255* (2006.01)
  *H02M 7/48* (2007.01)

(56) References Cited

U.S. PATENT DOCUMENTS

| | | |
|---|---|---|
| 2002/0097124 A1 | 7/2002 | Inoue et al. |
| 2003/0001718 A1 | 1/2003 | Inoue et al. |
| 2004/0207954 A1 | 10/2004 | Inoue et al. |
| 2004/0209120 A1 | 10/2004 | Inoue et al. |
| 2005/0007232 A1 | 1/2005 | Ono et al. |
| 2011/0241598 A1 | 10/2011 | Yamada et al. |

FOREIGN PATENT DOCUMENTS

| | | | |
|---|---|---|---|
| CN | 101118797 A | | 2/2008 |
| JP | 2000-294418 A | | 10/2000 |
| JP | 2001-068324 A | | 3/2001 |
| JP | 2005-294458 A | * | 10/2005 |
| JP | 2006-100292 A | | 4/2006 |
| JP | 2006-283166 A | | 10/2006 |
| JP | 2007-162103 A | | 6/2007 |
| JP | 2008-147403 A | | 6/2008 |
| JP | 2008-192887 A | | 8/2008 |
| JP | 2008-210820 A | | 9/2008 |
| JP | 2009188322 A | * | 8/2009 |
| JP | 2010-003838 | | 1/2010 |
| JP | 2010-245216 A | | 10/2010 |
| JP | 2011-192729 A | | 9/2011 |
| WO | 2009/034894 | * | 3/2009 |
| WO | WO-2010/073590 A1 | | 7/2010 |

OTHER PUBLICATIONS

Notification of the First Office Action in Chinese Patent Application No. 201280012858.9, dated Aug. 27, 2015.
Notification of the First Office Action in Chinese Patent Application No. 201280012862.5, dated Jul. 3, 2015.
Office Action in U.S. Appl. No. 13/977,898, dated Oct. 23, 2015.
Notification of the Second Office Action in Chinese Patent Application No. 2012800128625, dated Jan. 14, 2016.
Notification of Reasons for Rejection in Japanese Patent Application No. 2012-022329, dated Feb. 10, 2016.
Notification of Reasons for Rejection in Japanese Patent Application No. 2012-022328, dated Feb. 10, 2016.

* cited by examiner

COMPOSITE MATERIAL, REACTOR-USE CORE, REACTOR, CONVERTER, AND POWER CONVERTER APPARATUS

TECHNICAL FIELD

The present invention relates to a composite material suitable as a material structuring a magnetic part such as a reactor, a reactor-use core made of the composite material, a reactor including the core, a converter including the reactor, and a power converter apparatus including the converter. In particular, the present invention relates to a low-loss composite material with a high saturation magnetic flux density.

BACKGROUND ART

A magnetic part including a coil and a magnetic core where the coil is disposed, such as a reactor or a motor, is used in various fields. For example, Patent Literature 1 discloses a reactor used as a circuit component of a converter mounted on a vehicle such as a hybrid vehicle. Further, Patent Literature 1 discloses, as a material structuring a magnetic core included in the reactor, a composite material made up of a magnetic substance powder such as a pure iron powder, and a resin (a binder resin) including the powder. The composite material can be manufactured by packing a mixture obtained by mixing a raw-material magnetic substance powder and an uncured liquid resin in a mold assembly of a desired shape or the like, and then curing the resin.

CITATION LIST

Patent Literature

Patent Literature 1: Japanese Unexamined Patent Publication No. 2008-147403

SUMMARY OF INVENTION

Technical Problem

The magnetic core may be desired to have a low-loss characteristic while presenting a high saturation magnetic flux density, the loss being the iron loss (the hysteresis loss+the eddy current loss) or the like.

In the case where the composite material is used as the material structuring the magnetic core, for example, use of a pure iron powder as the raw-material magnetic substance powder provides a composite material of a high saturation magnetic flux density thanks to the high saturation magnetic flux density of the pure iron. However, use of such a pure iron may result in a composite material with a great eddy current loss because of the small electrical resistance of the pure iron. Use of a powder made of very fine particles as such a pure iron powder can reduce the eddy current loss thanks to the small particle size, and hence a low-loss composite material can be obtained. However, a pure iron powder is difficult to handle when its particle size is excessively small. Thus, a reduction in workability, and eventually a reduction in manufacturability of the composite material are invited.

On the other hand, Patent Literature 1 discloses a composite material in which the magnetic substance powder is an iron alloy powder. Since an iron alloy is greater than a pure iron in the electrical resistance, use of an iron alloy powder makes it possible to reduce the eddy current loss, and a low-loss composite material can be obtained. However, due to the small saturation magnetic flux density of an iron alloy, use of an iron alloy may result in a composite material with a low saturation magnetic flux density. Reducing the resin component in the composite material while increasing the magnetic substance powder, to thereby increase the proportion (content) of the magnetic component in the composite material, the saturation magnetic flux density can be increased. However, an excessively great content of the raw-material magnetic substance powder increases the viscosity of the mixture, whereby flowability becomes poor. Thus, it becomes difficult for the mixture to be poured into the mold assembly, resulting in poor manufacturability. In particular, with a complicated shape, the mixture may not be fully packed in the mold assembly, and a reduction in precision of shape may be invited. Accordingly, taking into consideration of loss-suppression and manufacturability, there are limitations on increasing the content of the magnetic substance powder.

Accordingly, an object of the present invention is to provide a low-loss composite material with a high saturation magnetic flux density.

Further, another object of the present invention is to provide a low-loss reactor-use core with a high saturation magnetic flux density, and to provide a reactor including the core.

Solution to Problems

The present invention achieves the objects stated above by employing, as the magnetic substance powder in a composite material, not the powder made of one type of material but the powder made up of a plurality of types of materials.

The composite material of the present invention contains a magnetic substance powder and a resin containing the powder being dispersed therein. The magnetic substance powder contains powders respectively made of a plurality of materials differing in the relative permeability.

The composite material of the present invention contains magnetic substance powders differing in the relative permeability, specifically, a magnetic substance powder with a high relative permeability, and a magnetic substance powder with a relatively low relative permeability. Since the composite material of the present invention contains the magnetic substance powders made of different materials, the composite material can possess the characteristics of both the powders. That is, the composite material can contain both a magnetic substance having a high saturation magnetic flux density and a low-loss magnetic substance. Accordingly, the composite material of the present invention can achieve a high saturation magnetic flux density and a low-loss characteristic in a well-balanced manner, as compared to the case where a magnetic substance powder made of a single material is contained. Further, since the composite material of the present invention contains the magnetic substance powders respectively made of a plurality of different materials, it is not necessary to use a very fine magnetic substance powder that cannot be handled with ease, or to use the magnetic substance powder by an excessively great amount. Thus, excellent manufacturability is exhibited. Further, the composite material of the present invention can contain both the magnetic substance with a high saturation magnetic flux density and the magnetic substance with a low relative permeability. Hence, saturation of the magnetic flux hardly occurs.

Note that, when the magnetic substances differ in the composition, normally, a change occurs in the relative permeability. Accordingly, in the present invention, the relative permeability is used as an index to the difference in the composition of any magnetic substance.

As one mode of the composite material of the present invention, the magnetic substance powder may contain a pure iron powder.

Since the pure iron has a high saturation magnetic flux density, this mode provides a higher saturation magnetic flux density. Further, since the magnetic substance powder made of a different material is contained, a low-loss characteristic is achieved.

As one mode of the composite material of the present invention, the magnetic substance powder may contain an iron alloy powder.

The iron alloy is greater than the pure iron in the electrical resistance. Accordingly, with the mode in which the iron alloy powder having a different composition is contained, an increase in the saturation magnetic flux density is achieved. Furthermore, a further low-loss characteristic is achieved. In particular, in the mode in which both the pure iron powder with a high saturation magnetic flux density and the iron alloy powder with a great electrical resistance are contained, the saturation magnetic flux density is higher and a low-loss characteristic is achieved.

As one mode of the composite material of the present invention, the magnetic substance powder may contain the pure iron powder by a greatest proportion.

With this mode, since the saturation magnetic flux density is higher and the magnetic substance powder of a different material is contained, a low-loss characteristic is achieved.

As one mode of the composite material of the present invention, the magnetic substance powder may contain a coated powder, the coated powder including magnetic substance particles and an insulating coat covering an outer circumference of each of the magnetic substance particles.

With this mode, particularly when the magnetic substance powder is made of metal, by containing the coated powder provided with the insulating coat, the eddy current loss can be reduced and a low-loss characteristic is achieved. Further, the greater the content proportion of the coated powder, the lower the loss.

As one mode of the composite material of the present invention, a plurality of peaks may be present in the particle size distribution of the magnetic substance powder. At least two peaks out of the peaks may respectively represent peaks of powders made of materials differing in the relative permeability from each other. Note that, the peak is defined as follows: in observing a frequency $f_x$ of a certain particle size $r_x$ in a particle size distribution, a frequency $f_s$ of a particle size $r_s$ smaller than the particle size $r_x$ by a prescribed value k (k being the design value) and a frequency $f_1$ of a particle size $r_1$ greater than the particle size $r_x$ by the prescribed value k (k being the design value) are observed. Then, the frequency $f_x$ satisfying the condition of being greater than the frequencies $f_s$ and $f_1$ by 1.1 times or more is regarded as the peak.

The presence of a plurality of peaks in the particle size distribution means that, in the histogram of the particle size distribution, a peak (high frequency value) is present at each of a location where the particle size is small and at a location where the particle size is great. In other words, at least two peaks, namely the first peak and the second peak, are present. Then, when it is defined that the particle size with which the first peak appears is $r_1$ and the particle size with which the second peak appears is $r_2$, the particle size $r_1$ is smaller than the particle size $r_2$. In this mode, the powder of the particle size $r_1$ and the powder of the particle size $r_2$ are made of different types of materials, and both the fine magnetic substance powder and the coarse magnetic substance powder are contained at high frequencies.

Here, the composite material of the present invention is manufactured by mixing a raw-material magnetic substance powder and a resin, and curing the resin. Since the shape and particle size of the magnetic substance powder used as the raw material do not substantially change before and after manufacture, the particle size distribution of the composite material of the present invention is substantially identical to the particle size distribution of the magnetic substance powder used as the raw material. The composite material in this mode can be manufactured through use of, as the raw material, a mixed powder made up of a fine powder and a coarse powder made of a material being different from that of the fine powder. Further, use of such a mixed powder makes it easier to increase the packing density of the magnetic substance powder. Accordingly, in this mode, since the magnetic substance powder made of different materials is contained, a high saturation magnetic flux density and a low-loss characteristic are achieved. Additionally, since the content of the fine magnetic substance powder is relatively great, a low-loss characteristic is achieved. Further, since the magnetic substance powder has a particular particle size distribution and is capable of increasing the packing density, the proportion of the magnetic component is high. Accordingly, the saturation magnetic flux density is high.

As one mode of the composite material of the present invention, a plurality of peaks may be present in the particle size distribution of the magnetic substance powder, and a powder that shows a peak, out of the peaks, with a minimum particle size may be the pure iron powder.

In this mode, since the pure iron powder is contained at high frequencies, the saturation magnetic flux density is high. Further, since the magnetic substance powder with a high saturation magnetic flux density (pure iron powder) is fine, the eddy current loss can be reduced as described above. Therefore, a low-loss characteristic is achieved.

As one mode of the composite material of the present invention, a plurality of peaks may be present in a particle size distribution of the magnetic substance powder, and a powder that shows a peak, out of the peaks, with a minimum particle size may be the iron alloy powder.

In this mode, since the iron alloy powder with a high electrical resistance is contained at high frequencies, a low-loss characteristic is achieved. Furthermore, since the iron alloy powder is fine, a further reduction in the eddy current loss is achieved. Accordingly, the loss becomes further lower.

As one mode of the composite material of the present invention, the composite material may contain non-magnetic substance powder made of at least one type of material. In particular, in a particle size distribution of mixed powder made up of the magnetic substance powder and the non-magnetic substance powder, a maximum particle size with which a peak of the non-magnetic substance powder appears may be smaller than a minimum particle size with which a peak of the magnetic substance powder appears.

The "magnetic substance" of the magnetic substance powder contained in the composite material of the present invention refers to a ferromagnetic material in a broad sense. Representatively, it is a soft magnetic material. On the other hand, the "non-magnetic substance" of the non-magnetic substance powder is a substance other than the ferromagnetic material. The non-magnetic substance powder may be, for example, a powder made of an inorganic material such as metal, e.g., ceramic or Al, a powder made of an organic material such as resin, e.g., silicone resin. The non-magnetic substance powder made of the materials listed above can be handled with ease even when they are in the form of a fine powder. Allowing the raw material to contain such a fine non-magnetic substance powder in addition to the magnetic substance powder, it becomes possible to effectively reduce precipitation of the magnetic substance powder in the resin during manufacture of the composite material. Such suppression of precipitation allows the magnetic substance powder to be uniformly dispersed in the mixture. By curing the resin in this state, the composite material in which the magnetic substance powder is uniformly dispersed can be obtained. That is, this mode can provide a uniform magnetic characteristic and hence is highly reliable. Further, with this mode, since the non-magnetic substance particles can be interposed in the clearance formed among the magnetic substance particles because of the non-magnetic substance powder being finer than the magnetic substance powder, a reduction in the proportion of the magnetic component attributed to the non-magnetic substance powder being contained can be suppressed.

In the mode in which the non-magnetic substance powder is contained, a maximum particle size $r_n$max with which a peak of the non-magnetic substance powder appears may be ⅓ or less as great as a minimum particle size $r_m$min with which a peak of the magnetic substance powder appears (i.e., satisfying the relationship $r_n\text{max} \leq (1/3) \times r_m\text{min}$). Further, as the mode in which the non-magnetic substance powder is contained, a particle size $r_n$ with which a peak of the non-magnetic substance powder appears may be 20 μm or less.

In this mode, thanks to the fully small non-magnetic substance powder, the fine non-magnetic substance particles can be adequately interposed in the clearance formed among the magnetic substance particles. Further, since the fine non-magnetic substance particles can be uniformly dispersed on the outer circumference of each of the magnetic substance particles with ease, precipitation of the magnetic substance particles can be suppressed effectively. Further, since the non-magnetic substance powder is fully small, the non-magnetic substance particles are present so as to bury the clearance. Therefore, with this mode, a reduction in the proportion of the magnetic component attributed to the non-magnetic substance powder being contained can be suppressed.

As the mode in which the non-magnetic substance powder is contained, the total content of the non-magnetic substance powder relative to the whole composite material may be 0.2 mass percent or more.

With this mode, since the non-magnetic substance powder, preferably the fine non-magnetic substance powder as described above, is adequately present, precipitation of the magnetic substance powder can be effectively suppressed.

As one mode of the composite material of the present invention, the total content of the magnetic substance powder relative to the whole composite material may be 30 volume percent or more and 70 volume percent or less. It is further preferable that the total content of the magnetic substance powder is 40 volume percent or more and 65 volume percent or less.

With this mode, since the magnetic substance powder is 30 volume percent or more, the proportion of the magnetic component is high enough, and hence the saturation magnetic flux density is high. Further, with this mode, since the magnetic substance powder is contained by 70 volume percent or less, the mixture of the magnetic substance powder and the resin flows with ease during manufacture, and excellent manufacturability is exhibited. In particular, when the magnetic substance powder is a material whose saturation magnetic flux density is approximately 2 T, such as iron or an Fe—Si alloy, a saturation magnetic flux density of the composite material of 0.6 T or more can be can be achieved with ease by the content being 30 volume percent or more; and furthermore, a saturation magnetic flux density of the composite material of 0.8 T or more can be achieved with ease by the content being 40 volume percent or more. In particular, use of the mixed powder as the raw material made up of the fine-particle powder and the coarse-particle powder makes it possible to easily achieve a high packing density, in which the content of the magnetic substance powder is approximately 65 volume percent.

As one mode of the composite material of the present invention, the saturation magnetic flux density of the composite material may be 0.6 T or more.

As described above, the present mode achieves a low-loss characteristic, and the saturation magnetic flux density is fully high. Accordingly, the composite material of this mode can be suitably used as a magnetic core of a magnetic part required to have such characteristics, for example, a reactor-use core included in a converter mounted on a vehicle such as a hybrid vehicle.

As one mode of the composite material of the present invention, the relative permeability of the composite material may be 5 to 20.

In this mode, since the relative permeability is relatively low, saturation of the magnetic flux does not occur easily. Using the composite material of this mode, for example, a magnetic core of the gapless structure can be formed. Further, since this mode provides the magnetic characteristic suitable for a reactor-use core included in a converter mounted on a vehicle such as a hybrid vehicle, it can be suitably used as such a reactor-use core. The method for measuring the saturation magnetic flux density and the relative permeability will be described later.

As one mode of the composite material of the present invention, the circularity of each particle structuring the magnetic substance powder may be 1.0 or more and 2.0 or less.

Use of the particles of a certain circularity as in this mode makes it possible to adequately form the clearance among the particles in which other particles can be interposed. Thus, the packing density can be increased with ease, and the powder exhibits excellent flowability. Accordingly, this mode provides a high saturation magnetic flux density and excellent manufacturability. It is preferable that the circularity is 1.0 or more and 1.5 or less, in particular, 1.0 or more and 1.3 or less. The method for measuring the circularity will be described later.

As described above, the composite material of the present invention can be used as a magnetic core used for a reactor. Accordingly, a reactor-use core of the present invention may be made of the composite material of the present invention.

Since the reactor-use core of the present invention is made of the composite material with a low-loss characteristic and a high saturation magnetic flux density as described above, the loss is low and the saturation magnetic flux density is high.

A reactor of the present invention may include a coil and a magnetic core where the coil is disposed. At least part of the magnetic core may be made of the composite material of the present invention.

In connection with the reactor of the present invention, since at least part of the magnetic core is made of the composite material with a low-loss characteristic and a high saturation magnetic flux density as described above, the reactor can achieve a low-loss characteristic and have a high saturation magnetic flux density.

Alternatively, the reactor of the present invention includes a coil and a magnetic core where the coil is disposed. In the magnetic core, at least part of a portion is made of a powder magnetic core and other portion is made of the composite material of the present invention. For example, in the magnetic core, at least part of a portion disposed inside the sleeve-like coil made of a wound wire is made of a powder magnetic core, and at least part of a portion disposed outside the coil is made of the composite material of the present invention (hereinafter, this mode is referred to as the inner powder magnetic core mode). Alternatively, for example, in the magnetic core, at least part of a portion disposed inside the sleeve-like coil made of a wound wire is made of the composite material of the present invention, and at least part of a portion disposed outside the coil is made of a powder magnetic core (hereinafter, this mode is referred to as the outer powder magnetic core mode).

In the inner powder magnetic core mode, in the magnetic core, the powder magnetic core is provided at the portion disposed inside the coil (hereinafter the portion is referred to as the inner core), and the composite material of the present invention is provided at the portion disposed outside the coil (hereinafter the portion is referred to as the outer core). Thus, the saturation magnetic flux density of the inner core can be increased with ease to be higher than that of the outer core. Since the saturation magnetic flux density of the inner core is high, as compared to the case where the entire magnetic core is made of a material of a relatively low permeability and hence the saturation magnetic flux density is uniform, the cross section of the inner core can be reduced. That is, the inner core can be reduced in size, and according to the inner core being small in size, the coil also can be reduced in size. Therefore, the inner powder magnetic core mode can provide the reactor of a small size. Further, by a reduction in the size of the coil, a reduction in the weight of the reactor can also be achieved. On the other hand, contrary to the inner powder magnetic core mode described above, in the outer powder magnetic core mode, the inner core is provided with the composite material of the present invention, and the outer core is provided with the powder magnetic core. Thus, the saturation magnetic flux density of the outer core can be increased with ease to be higher than that of the inner core, and the leakage flux from the outer core to the outside can be reduced. Further, in each of those modes, part of the magnetic core is made of the composite material of the present invention containing the resin component. Accordingly, the relative permeability of the entire magnetic core can be reduced, and hence the gapless structure can be achieved, for example. With the magnetic core of the gapless structure, no leakage flux from the gap portion affects the coil. Therefore, the coil can be disposed in close proximity to the inner core, and hence the reactor of a small size can be obtained. Further, by a reduction in the size of the coil, the wire also can be shortened. Therefore, a reduction in the weight of the reactor can be achieved.

The reactor of the present invention can be used as a constituent component of a converter. The converter of the present invention includes a switching element, a driver circuit controlling an operation of the switching element, and a reactor smoothing a switching operation. By the operation of the switching element, an input voltage is converted. The reactor may be the reactor of the present invention. The converter of the present invention can be suitably used as a constituent component of a power converter apparatus. A power converter apparatus of the present invention includes a converter converting an input voltage, and an inverter connected to the converter to perform interconversion between a direct current and an alternating current. A load is driven by power obtained by the conversion of the inverter. The converter may be the converter of the present invention.

The converter of the present invention and the power converter apparatus of the present invention achieve a low-loss characteristic, because they include the reactor of the present invention having a high saturation magnetic flux density and a low-loss characteristic.

Advantageous Effects of Invention

The composite material of the present invention, the reactor-use core of the present invention, and the reactor of the present invention have a low-loss characteristic and a high saturation magnetic flux density.

DESCRIPTION OF EMBODIMENTS

Figure 1:
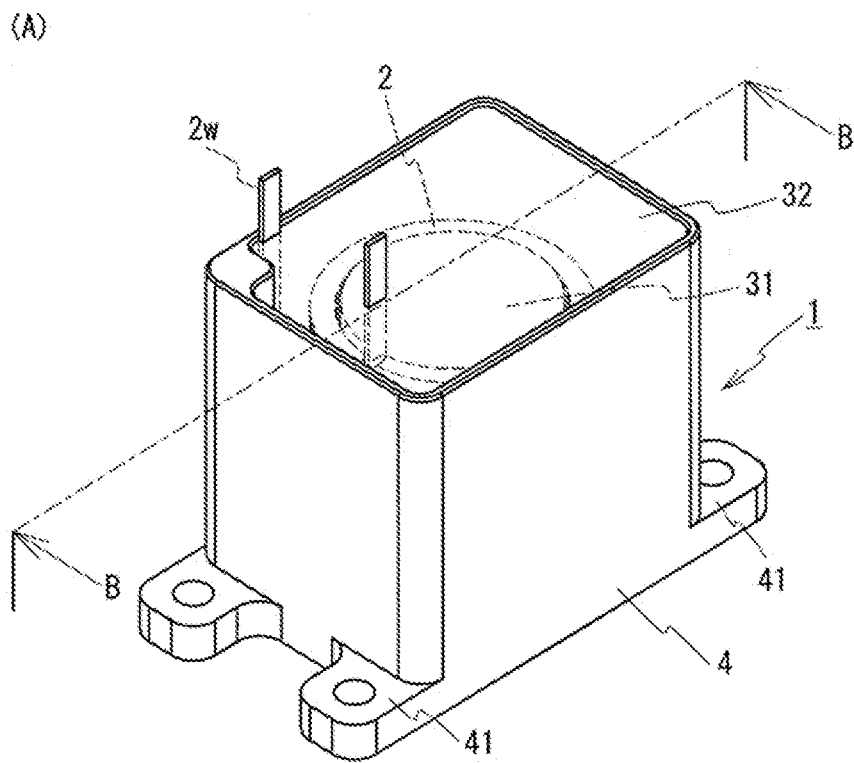
FIG. 1 (A) is a schematic perspective view of a reactor according to a first embodiment, and FIG. 1 (B) is a cross-sectional view of the reactor taken along line B-B.
Figure 1:
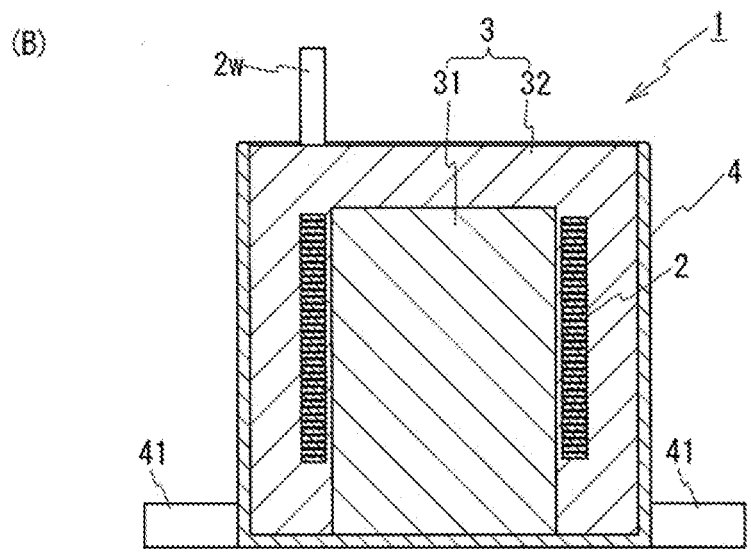

In the following, embodiments of the present invention will be described in more detail.

(First Embodiment)

With reference to the drawings, a description will be given of a reactor 1 of the first embodiment. Identical reference symbols in the drawings denote identically named elements. The reactor 1 includes a single coil 2 made of a wound wire 2w, and a magnetic core 3 disposed inside and outside of the coil 2 to form a closed magnetic path. The reactor 1 is characterized in the material structuring the magnetic core 3.

In the following, a detailed description will be given of each structure.

[Coil 2]

The coil 2 is a sleeve-like element made of the single continuous wire 2w being spirally wound. The wire 2w is suitably a coated wire, which includes a conductor made of an electrically conductive material such as copper or aluminum, or an alloy of copper or aluminum, the conductor being provided with an insulating coat made of an insulating material around its outer circumference. The conductor may be of various shapes, such as a rectangular wire with a rectangular cross-sectional shape, a round wire with a circular cross-sectional shape, a deformed wire with a polygonal cross-sectional shape and the like. The representative insulating material structuring such an insulating coat is an enamel material such as polyamide-imide. The greater the thickness of the insulating coat, the greater the insulating performance. The specific thickness may be 20 μm or more and 100 μm or less. The cross-sectional area of the wire 2w and the number of winding thereof (number of turns) can be selected as appropriate, so as to achieve a desired characteristic. The end face shape of the coil 2 may be the shape such as a ring-like shape shown in FIG. 2 or an elliptical shape, i.e., whose outer shape is formed solely with a curved line, or it may be a flat shape such as a racetrack shape or a rounded rectangular shape, i.e., whose outer shape is formed with a curved lines and straight lines. With a cylindrical coil whose end face is a ring-like shape, the wire can be easily wrapped around, and can be easily formed.

Here, the coil 2 is an edgewise coil made of an edgewise-wound coated rectangular wire, which includes a conductor being a copper rectangular wire with a rectangular cross-sectional shape and an insulating coat being enamel. The end face shape of the coil 2 is ring-like.

The opposite end portions of the wire 2w forming the coil 2 are pulled from the turn as appropriate and drawn outside the magnetic core 3 (the outer core portion 32). To the conductor portion of each of the opposite end portions being exposed by the insulating coat being peeled off, a terminal member (not shown) made of an electrically conductive material such as copper or aluminum is connected through welding (e.g., TIG welding) or fixation under pressure. Through the terminal member, an external apparatus (not shown) such as power supply supplying the coil 2 with power or the like is connected.

With the reactor 1 shown in this example, the combined product made up of the coil 2 and the magnetic core 3 is stored in a bottomed sleeve-like case 4. The coil 2 is stored such that its axial direction becomes perpendicular to the bottom face of the case 4 (in the following, this mode is referred to as the upright). The upright mode can reduce the installation area of the reactor 1 relative to the installation target such as a cooling table where the reactor 1 is installed.

[Magnetic Core 3]

The magnetic core 3 forms a closed magnetic path when the coil 2 is excited. As shown in FIG. 1 (B), the magnetic core 3 includes a columnar inner core portion 31 being at least partially disposed inside the coil 2 and covered by the coil 2, and an outer core portion 32 being disposed outside the coil 2 and formed to substantially cover part of the inner core portion 31 and the sleeve-like outer circumferential face of the coil 2. In this example, the inner core portion 31 and the outer core portion 32 are made of materials being different from each other's. The inner core portion 31 is made of a powder magnetic core, whereas the outer core portion 32 is made up of a magnetic substance powder and a composite material (hardened mold product), which includes a resin containing the powder being dispersed therein. Here, the greatest characteristic of the reactor 1 lies in that the magnetic substance powder contained in the composite material is made of a plurality of types of powders differing in the relative permeability.

<<Inner Core Portion>>

Here, the inner core portion 31 is a columnar element conforming to the inner circumferential shape of the coil 2. The cross-sectional shape or outer shape of the inner core portion 31 can be selected as appropriate. It may conform to the inner circumferential shape of the coil, e.g., it may be prism-like such as rectangular parallelepiped, or ellipsoidal. Alternatively, it may not conform to the inner circumferential shape of the coil. Further, here, the inner core portion 31 is a solid element in which no gap member such as an alumina plate or air gap is interposed. However, it is also possible to employ the mode in which a gap member made of a material being lower in the permeability than the powder magnetic core or the composite material, representatively a non-magnetic material, or an air gap is interposed.

The powder magnetic core is representatively obtained by: molding a magnetic powder including magnetic substance particles and an insulating coat that is made of silicone resin or the like and that covers the surface of the particles, or mixed powder in which a binder is mixed into the magnetic powder as appropriate; and thereafter baking the molded powder at the heat resistant temperature of the insulating coat or lower than that. In preparing the powder magnetic core, by adjusting the material of the magnetic substance particle, the mixing ratio of the magnetic powder and the binder, the amount of various coats including the insulating coat, or by adjusting the molding pressure, the magnetic characteristic of the powder magnetic core can be changed with ease. For example, employing a powder with a high saturation magnetic flux density, increasing the proportion of the magnetic component by reducing the blending amount of the binder, or increasing the molding pressure, a powder magnetic core with a high saturation magnetic flux density can be obtained.

The material of the magnetic substance particles may be an iron-base material, such as iron group metal such as Fe, Co, Ni or the like (e.g., a pure iron made of Fe and inevitable impurities), an iron alloy whose main component is Fe (e.g., an Fe—Si base alloy, an Fe—Ni base alloy, an Fe—Al base alloy, an Fe—Co base alloy, an Fe—Cr base alloy, an Fe—Si—Al base alloy or the like), a rare earth metal, and a soft magnetic material such as ferrite. In particular, with the iron-base material, it is easier to obtain a powder magnetic core being higher in the saturation magnetic flux density than ferrite. The material structuring the insulating coat formed at the magnetic substance particles may be, for example, phosphate compounds, silicon compounds, zirconium compounds, aluminum compounds, boron compounds and the like. The insulating coat is preferable to use when the magnetic substance particles are made of metal such as the iron group metal or iron alloy as noted above, because the eddy current loss can be reduced. When the magnetic substance particles are made of an insulating substance such as ferrite, the insulating coat can be dispensed with. The binder may be, for example, a thermoplastic resin, a non-thermoplastic resin, or higher fatty acid. The binder may vanish by the baking process described above, or may change into an insulating substance such as silica. In connection with the powder magnetic core, by the insulating substance such as the insulating coat being present among the magnetic substance particles, the magnetic substance particles are insulated from one another. Thus, the eddy current loss can be reduced. Accordingly, even in the case where the coil is energized with high-frequency power, such a loss is small. Further, the powder magnetic core can be molded with ease even when it is in a relatively complicated three-dimensional shape, and hence excellent manufacturability is exhibited. Any known powder magnetic core can be used. Here, the powder magnetic core structuring the inner core portion 31 is made of a soft magnetic powder provided with a coat such as the insulating coat.

In the example shown in FIG. 1, the length of the inner core portion 31 in the axial direction of the coil 2 (hereinafter simply referred to as the length) is greater than the length of the coil 2. Further, in this example, the inner core portion 31 is stored in the case 4 such that the one end face of the inner core portion 31 (the face arranged on the opening side of the case 4 in FIG. 1 (B)) is substantially flush with the one end face of the coil 2, and the other end face (the face arranged on the bottom face side of the case 4 in FIG. 1 (B)) and the nearby portion project from the other end face of the coil 2. Accordingly, in connection with the reactor 1, the portion of the magnetic core 3 disposed in the sleeve-like coil 2 is formed by the powder magnetic core structuring part of the inner core portion 31, and the portion disposed outside the coil 2 is formed by the powder magnetic core structuring the other part of the inner core portion 31 and a composite material (to be described later) structuring the outer core portion 31.

The projection length of the inner core portion can be selected as appropriate. Here, though only the other end face side of the inner core portion 31 projects from the other end face of the coil 2, it is also possible that the both end faces of the inner core portion 31 project from the respective end faces of the coil 2. Here, the projection lengths may be identical to or different from each other. Further, the length of the inner core portion and the length of the coil may be identical to each other. That is, the end faces of the inner core portion and the end faces of the coil may be flush with each other. For example, in the magnetic core, only the portion disposed in the coil may be made of the powder magnetic core, and the whole portion disposed outside the coil may be made of the composite material. In any of the modes noted above, the composite material, whose description will follow, is included such that a closed magnetic path is formed when the coil 2 is excited.

<<Outer Core Portion>>

Here, the whole outer core portion 32 is structured by the composite material made up of the magnetic substance powder and a resin. Similarly to the inner core portion 31, no gap member or air gap is interposed in the outer core portion 32. By the resin, the outer core portion 32 and the inner core portion 31 stored in the case 4 are joined to each other without having any adhesive agent interposed, to structure the integral magnetic core 3.

In this example, the outer core portion 32 is formed to cover the opposite end faces and outer circumferential face of the coil 2, the one end face and outer circumferential face on the other end face side of the inner core portion 31. As shown in FIG. 1 (B), its cross-sectional shape taken along the axial direction of the coil 2 is an inverted U-shape. The shape of the outer core portion 32 is not particularly limited so long as a closed magnetic path can be formed. For example, it is also possible to employ the mode in which the outer circumference of the coil 2 is not partially covered by the composite material structuring the outer core portion 32. In the lateral mode (a fourth embodiment) which will be described later, the mode in which the outer circumference of the coil 2 is partially exposed outside the composite material can be implemented with ease.

The magnetic substance powder in the composite material contains powders made up of a plurality of materials differing in the relative permeability. Preferably, the powders are made of the soft magnetic powder described above. In particular, the powders both containing Fe but of different compositions can be suitably used. The composition containing Fe may be a pure iron made of Fe and inevitable impurities, and an iron alloy made of Fe, additive elements, and inevitable impurities.

An exemplary pure iron may be a pure iron containing Fe by 99.5 mass percent or more. When a pure iron powder is contained, a composite material with a high saturation magnetic flux density is obtained. The higher the content proportion of the pure iron powder, the easier to obtain a core (composite material) with a high saturation magnetic flux density. In particular, when the pure iron powder is a coated powder including iron particles made of a pure iron and an insulating coat covering the outer circumference of each of the iron particles, the eddy current loss can be reduced because the insulating coat interposed among the iron particles insulates the iron particles from one another. Accordingly, with the mode in which the coated powder is contained, a low-loss core with a high saturation magnetic flux density can be obtained with ease. An exemplary insulating material structuring the insulating coat may be phosphate, silicone resin, metal oxide, metal nitride, metal carbide, metal phosphate compound, metal borate compound, or metal silicon compound. The metallic element included in the oxides and compounds such as the metal salt compound may be Fe, Al, Ca, Mn, Zn, Mg, V, Cr, Y, Ba, Sr, rare-earth elements (except for Y) or the like. Employing the mode in which the particles made of an iron alloy, whose description will follow, each also includes the insulating coat, a core having a low-loss characteristic can be obtained with ease.

When an iron alloy is contained, the eddy current loss is reduced and a low-loss composite material is obtained. Accordingly, with the mode in which an iron alloy powder is contained in addition to the pure iron powder, a low-loss core with a high saturation magnetic flux density can be obtained with ease. In this mode, the greater the content of the pure iron powder, the greater an increase in the saturation magnetic flux density. Accordingly, when an improvement in the saturation magnetic flux density is desired, it is preferable that the magnetic substance powder is made up of a majority of the pure iron powder. More preferably, the content of the pure iron powder is the greatest.

Alternatively, it is possible to employ the mode in which such a pure iron powder is not contained, and the magnetic substance powder in the composite material is made of an iron alloy powder of different composition. In this mode, since the magnetic substance powder is entirely an iron alloy powder, the eddy current loss is small and a low-loss characteristic is obtained. Furthermore, the saturation magnetic flux density can be increased by adjusting the composition.

The iron alloy may be an alloy containing, as an additive element, at least one type of element selected from Si, Ni, Al, Co, and Cr by a total of 1.0 mass percent to 20.0 mass percent. More specifically, the iron alloy may be an Fe—Si base alloy, an Fe—Ni base alloy, an Fe—Al base alloy, an Fe—Co base alloy, an Fe—Cr base alloy, and an Fe—Si—Al base alloy. In particular, the iron alloy containing Si such as an Fe—Si base alloy or an Fe—Si—Al base alloy (Sendust) is high in the electrical resistance and the eddy current loss can be suppressed with ease. Furthermore, the hysteresis loss is low. Therefore, a core having a low-loss characteristic can be obtained with ease.

The magnetic substance powder structuring the composite material may contain the powder of the same type as the magnetic substance powder of the powder magnetic core structuring the inner core portion 31 described above, or may be wholly made of a powder of a different type. Further, when the magnetic substance powder structuring the composite material is previously subjected to an appropriate surface treatment, the effects such as prevention of aggregation, suppression of precipitation in the resin and the like can be expected. For example, when the surface treatment is previously performed with a silane coupling agent or the like, adhesion between the magnetic substance powder and the resin can be improved, and precipitation of the magnetic substance powder in the uncured resin can be suppressed. It is preferable to perform the surface treatment using a different treatment agent for each composition such that the magnetic substance particles of the same type (same composition) do not easily aggregate. Thus, the magnetic substance particles of different types can be uniformly dispersed in the entire composite material. Various surfactants can be used as the surface treatment agent. For example, hydrophobic agents may be used for the pure iron powder and hydrophilic agents may be used for the iron alloy powder. The surface treatment may be performed in turn, or may be performed at the same time. Note that, though it is possible to mix the surface treatment agent for preventing the precipitation at the time when the magnetic substance powder and the resin are mixed, the effect of preventing precipitation tends to be exhibited higher when the surface treatment is performed before such mixing is performed.

The particles of the materials structuring the magnetic substance powder each may take any shape, such as spherical or non-spherical (e.g., plate-like, needle-like, rod-like, and any other deformed shape). That is, in manufacturing the composite material, the powder made of particles of any shape can be used as the raw material, and the shape of the magnetic substance powder that can be used as the raw material is flexible. Note that, the shape and size of the magnetic substance particles in the composite material substantially maintain the shape and size of the particles structuring the powder used as the raw material. Accordingly, when a non-spherical magnetic substance powder is used as the raw material, the magnetic substance particles in the composite material are also non-spherical.

In particular, the particles each approximating a sphere can fully secure the clearance among the particles where fine particles smaller than those particles can be interposed. Accordingly, the packing density can be further increased with ease, while the loss tends to be small. Therefore, a method for manufacturing the composite material may include use of particles structuring the raw-material powder each of which particles satisfies the condition that the circularity is 1.0 or more and 2.0 or less.

The circularity is defined as maximum diameter/equivalent circle diameter. The equivalent circle diameter is obtained by specifying the contour of each particle structuring the magnetic substance powder to determine a diameter of a circle having the area identical to an area S surrounded by the contour. That is, the equivalent circle diameter is expressed as: $2 \times \{\text{area S in the contour}/\pi\}^{1/2}$. Further, the maximum diameter is the maximum length of a particle having such a contour. The area S may be obtained by, for example, preparing a sample by binding the raw material powder with a resin or the like, and observing the cross section of the sample through use of an optical microscope, a scanning electron microscope, i.e., SEM, or the like. The area S in the contour should be calculated by extracting the contour of the particle by subjecting the observation image of the obtained cross section to image processing (e.g., binarizing processing) or the like. The maximum diameter may be obtained by extracting the maximum length of the particle from the contour of the extracted particle. In the case where SEM is used, the measurement condition may be as follows: the number of cross section is 50 or more (one field of view per cross section); magnification is 50 times to 1000 times; the number of measured particles per field of view is 10 or more; and the number of particles in total is 1000 or more.

The particle whose circularity is specified to be 1 by the measurement method described above corresponds to a perfect sphere. The closer the circularity of the raw material powder to 1, the easier to reduce the loss, suppress an excessive increase in the relative permeability, and obtain effects such as an improvement in packing density or an achievement of excellent flowability. Therefore, it is preferable that the circularity of the raw material powder satisfies the condition of being 1.0 or more and 1.5 or less, in particular, 1.0 or more and 1.3 or less. With spherical particles, even when the particles are adjacent to each other, they are merely brought into point contact with one another substantially, and may not be brought into surface contact with one another. Here, in the case where the magnetic substance particles dispersed in the resin in the composite material are brought into contact with one another at many points, the relative permeability of the composite material may become excessively great. Furthermore, the eddy current may flow among the particles when the magnetic substance particles are made of metal. In order to suppress such an increase in the relative permeability or an occurrence or increase of the eddy current caused by excessive contact among the particles, particularly when the magnetic substance particles are made of metal, the magnetic substance powder should be a magnetic substance powder having an insulating coat made of a non-magnetic material, such as the coated powder described above. On the other hand, when particles each approximating the perfect sphere such as those satisfying the condition of circularity are used as the raw material powder, despite being the magnetic substance particles with no insulating coat, excessive contact among the particles can be suppressed, and the relative permeability of the composite material can be suppressed at low values. Accordingly, use of the raw material powder satisfying the condition as to the circularity may be one effective configuration for obtaining a composite material with a high saturation magnetic flux density of 0.6 T or more, and simultaneously, whose relative permeability assumes a relatively small value of 20 or less.

The powder whose circularity falls within the range noted above may be obtained by, for example, preparing the powder through gas atomization in which an inert gas is used as a cooling medium, or subjecting a deformed shape powder (i.e., the powder whose circularity does not fall within the range noted above) formed through water atomization or the like to a rounding treatment such as grinding. When grinding is performed, by selecting the grain size of the abrasive grain as appropriate, the circularity of the raw material powder can be adjusted. Further, in the case where the raw material powder contains a coarse powder also, the loss of the composite materials may become smaller when the powder approximates a sphere, that is, when the circularity of the powder is close to 1.0. Note that, since the composite material of the present invention is molded under a relatively low pressure, the circularity of each particle structuring the magnetic substance powder in the composite material becomes substantially identical to the circularity of each particle structuring the raw material powder. Measurement of the circularity of the composite material of the present invention may be performed by, for example, obtaining the cross section of the composite material, and using an observation image through microscopic observation of the cross section as described above.

Obtaining the particle size distribution of the magnetic substance particles in the composite material, a plurality of peaks may be present in the particle size distribution. In this manner, particles of a certain small particle size and particles of a certain great particle size are both present at high frequencies to some degree. In the clearance formed among the coarse particles, the fine particles can be interposed. Therefore, with the composite material, packing density of the magnetic substance powder can be increased with ease, and the proportion of the magnetic component is high.

Though the number of peaks may be two, three or more, depending on the particle size, the packing density can be fully increased with two peaks. For example, in the particle size distribution, when the particle size with which the first peak appears is $r_1$ and the particle size with which the second peak appears is $r_2$, two peaks satisfying the relationship of $r_1 \leq (1/2) \times r_2$ may be present. The fine particles of the particle size $r_1$, which is half as great as the particle size $r_2$ of the coarse particles or less than that, can be fully interposed in the clearance among the coarse particles, and hence the packing density can be increased. As the difference in the particle size between the particle size $r_1$ and the particle size $r_2$ is greater, the clearance can be filled with particles more efficiently, and the packing density tends to be increased with ease. Therefore, it is further preferable that the particle size $r_1$ satisfies the relationship of $r_1 \leq (1/3) \times r_2$. However, when the particle size $r_1$ is excessively small, the raw material powder also becomes fine and difficult to be handled. Thus, a reduction in workability is prone to be invited. Accordingly, it is preferable that the relationship $r_1 \geq (1/10) \times r_2$ is satisfied.

Though the magnetic substance powder having the plurality of peaks may be made of a material of the same type (same composition), it is preferable that the magnetic substance powder having a plurality of peaks is made of materials of different types. Specifically, one peak may be the peak of a pure iron powder and other peak is the peak of an iron alloy powder, or the peaks are the peaks of iron alloy powders of different compositions.

In the mode where both the pure iron powder and the iron alloy powder are contained, in the case where the powder showing the peak with the minimum particle size is the pure iron powder, that is, in the case where the particle size $r_1$ is of the pure iron powder and the particle size $r_2$ is of the iron alloy powder, the eddy current loss can be reduced despite the presence of the pure iron powder, because the fine pure iron powder is contained at high frequencies. Accordingly, with this mode, a high saturation magnetic flux density is achieved thanks to the pure iron powder being present at high frequencies, and a low-loss characteristic is achieved thanks to the fine pure iron powder and the iron alloy powder being contained as being mixed. Further, with this mode, since the fine pure iron particles of a high saturation magnetic flux density are continuously present with ease around the coarse iron alloy particles, the magnetic flux can pass through uniformly easily.

On the other hand, in the mode in which both the pure iron powder and the iron alloy powder are included, in the case where the powder showing the peak with the minimum particle size is the iron alloy powder, that is, in the case where the particle size $r_1$ is of the iron alloy powder and the particle size $r_2$ is of the pure iron powder, the eddy current loss can be further reduced, because the fine iron alloy powder is contained at high frequencies. Accordingly, with this mode, a high saturation magnetic flux density is achieved thanks to the pure iron powder being contained and a further low-loss characteristic is achieved thanks to the fine iron alloy powder.

In the mode in which only the iron alloy powder is contained, depending on the characteristic of the powder that shows the peak with the minimum particle size, a higher saturation magnetic flux density may be achieved or a further low-loss characteristic is achieved.

As to the specific particle size, in the case where the first peak is of the pure iron powder, preferably the particle size $r_1$ is 50 μm or more and 100 μm or less, and particularly preferably the particle size $r_1$ is 50 μm to 70 μm. Since the particle size of the finest particle existing at high frequencies is 50 μm or more, very fine particles measuring less than 50 μm are small in number. Thus, the raw-material powder can be handled with ease even when the particles are made of the pure iron. On the other hand, in the case where the first peak is of the iron alloy powder, since the iron alloy is easy to handle even when each particle measures less than 50 μm, the particle size $r_1$ may be 50 μm or less. For example, the particle size $r_1$ may be 10 μm or more and 30 μm or less. With this mode, since the particle size $r_1$ is further smaller and the particles are made of an iron alloy, the following effects are achieved: (1) a composite material with a low loss can be obtained with ease, thanks to a reduction in the eddy current loss; and (2) because the packing density can be increased further easier, the saturation magnetic flux density is also high to some degree despite the particles being made of an iron alloy. Further, with an iron alloy, spherical particles can be formed with ease when the particle size is relatively fine, e.g., 50 μm or less. Thus, excellent manufacturability is achieved even with the powder of fine spherical particles. The smaller the particle size $r_1$ in the range described above, the greater a reduction in the loss; the greater the particle size $r_1$, the better the handleability.

In the case where the second peak is of the pure iron powder, preferably the particle size $r_2$ may be 100 μm or more and 200 μm or less, and particularly preferably the particle size $r_2$ may be 140 μm to 200 μm (preferably $r_1 \leq (1/2) \times r_2$)). Further, in the case where the powders showing the first peak and the second peak are both the iron alloy powders differing in the composition, the particle size $r_2$ may be 30 μm or more and 200 μm or less (where $r_1 < r_2$), and further may be 40 μm or more and 150 μm or less. Since fully great particles (particles of the particle size $r_2$) are contained at high frequencies relative to the fully fine particles (particles of the particle size $r_1$) measuring 50 μm to 100 μm, or 50 μm or less, the packing density of the composite material is increased and the proportion of the magnetic component becomes high. Therefore, a high saturation magnetic flux density can be achieved and furthermore the eddy current loss can be reduced. Further, since the particle size $r_2$ satisfies the range stated above, the particle size difference between the particle size $r_1$ and the particle size $r_2$ is great. Hence, as described above, the packing density can be increased with ease. Furthermore, since the particle size $r_2$ is 200 μm or less, the eddy current loss is reduced with ease.

The particle size distribution of the magnetic substance powder in the composite material structuring the outer core portion 32 may be measured by, for example, extracting the magnetic substance powder by removing the resin component, and analyzing the obtained magnetic substance powder using a particle size analyzer. It is also possible to measure the particle size distribution for each composition of the magnetic substance powder, and thereafter combine the particle size distributions. When the composite material contains a non-magnetic substance powder which will be described later, the magnetic substance powder and the non-magnetic substance powder should be selectively separated through use of a magnet. Alternatively, they may be selectively separated by carrying out a component analysis through use of X-ray diffraction, energy-dispersive X-ray spectroscopy, i.e., EDX or the like. Any commercially available particle size analyzer can be used. With this scheme, thanks to the absence of the resin component, the particle size distribution of the magnetic substance powder can be measured highly precisely.

The composite material having the particle size distribution noted above may be manufactured through use of, as the raw material, a magnetic substance powder of a desired composition containing particles of particle sizes $r_{10}$ and $r_{20}$ satisfying $r_{10} < r_{20}$ (preferably $r_{10} \leq (1/2) \times r_{20}$) at high frequencies. When any commercially available powder is used, the particle size distribution should be examined to use the powder having the specific particle size distribution as described above. Powders may be classified through use of a sieve or the like, such that the desired particle size is achieved. The raw material powder can be representatively manufactured by atomization (gas atomization, water atomization and the like). In particular, use of a powder manufactured by gas atomization tends to provide a composite material with a low loss. A coarse powder may be crushed as appropriate, such that the desired particle size is achieved. Further, as the raw-material powder, preparing a plurality of powders each having a desired composition as described above and using the powders that agree with the circularity as described above, a composite material with a further smaller loss and a higher saturation magnetic flux density can be obtained with ease.

Note that, when a magnetic substance powder made of particles with a small particle size difference is used as the raw material, the peak may be present only one in number in the particle size distribution of the magnetic substance powder in the composite material. Further, in manufacturing the composite material of the present invention, it is also possible to use, as the raw material, the magnetic substance powders being identical in the particle size distribution but differing in the composition from each other. In this case also, in the particle size distribution of the magnetic substance powders in the composite material, only one broad peak or sharp peak is present.

When the total content of the magnetic substance powder is 30 volume percent or more and 70 volume percent or less relative to the whole composite material, the proportion of the magnetic component is high enough, and a composite material with a high saturation magnetic flux density can be obtained. Further, when the total content of the magnetic substance powder is 70 volume percent or less, the mixture of the raw-material magnetic substance powder and the uncured resin exhibits excellent flowability in manufacturing the composite material. Accordingly, the mixture can be packed in a mold assembly in an excellent manner. Thus, excellent manufacturability of the composite material is achieved. In particular, the magnetic substance powder of 40 volume percent or more and 65 volume percent or less is excellent in handleability. The raw material powder is prepared such that the desired content is achieved. The content of the magnetic substance powder in the composite material can be obtained by: obtaining the volume of the magnetic component by removing the resin component; or converting the volume proportion from the area proportion of the magnetic component in the cross section by subjecting the photomicrograph of the cross section to image processing as described above.

As the resin serving as the binder in the composite material, a thermosetting resin such as epoxy resin, phenolic resin, silicone resin, urethane resin or the like can be suitably used. When the thermosetting resin is used, the mixture packed in the mold assembly is heated, to thermally cure the resin. Alternatively, as the resin serving as the binder, a room temperature curing resin or a low-temperature curing resin can be used. In this case, the mixture packed in the mold assembly is left at the room temperature to relatively low temperatures, to cure the resin. Alternatively, as the resin serving as the binder, a thermoplastic resin such as polyphenylene sulfide (PPS) resin, polyimide resin, fluororesin or the like can be used.

In the composite material, since a relatively great amount of resin, which is generally a non-magnetic material, is present, the outer core portion 32 made of the composite material tends to be lower in the saturation magnetic flux density than the powder magnetic core structuring the inner core portion 31, and its relative permeability also tends to be reduced. By adjusting the material of the magnetic substance powder, the thickness of the insulating coat noted above, the resin amount and the like, the magnetic characteristic of the composite material can be changed with ease.

The composite material can be formed by, representatively, injection molding or cast molding. In injection molding, the magnetic substance powder and a resin having flowability (i.e., a liquid resin, which generally has viscosity) are mixed with each other. The mixture (slurry-like mixture) is poured into a mold assembly of a prescribed shape under a prescribed pressure, and molded. Thereafter, the resin is cured. In cast molding, a mixture similarly to that obtained in injection molding is obtained. Thereafter, the mixture is poured into a mold assembly without application of pressure, and molded and cured. In the first embodiment, the case 4 can be used as the mold assembly. In this case, a composite material of a desired shape (here, the outer core portion 32) can be molded with ease. It is also possible to prepare a plurality of molded products of desired shapes and combine them, to form a magnetic core of a desired shape.

Here, the outer core portion 32 is structured by a composite material made up of a coated powder made of a pure iron powder whose surface is coated by an insulating coat, epoxy resin, and an iron alloy powder. Further, the composite material includes a greater amount of the iron powder (coated powder) than the iron alloy powder.

<<Magnetic Characteristic>>

The magnetic characteristic of the magnetic core 3 partially differs. In this example, the inner core portion 31 is higher than the outer core portion 32 in the saturation magnetic flux density, and the outer core portion 32 is lower than the inner core portion 31 in the relative permeability.

Here, the saturation magnetic flux density of the inner core portion 31 is 1.6 T or more, and the relative permeability is 100 to 500. Further, the saturation magnetic flux density of the inner core portion 31 is higher than the outer core portion 32 by 1.2 times or more. Here, in the case where a certain magnetic flux is to be obtained, as the absolute value of saturation magnetic flux density of inner core portion 31 at least at the portion covered by the coil 2 is greater, and as the saturation magnetic flux density of that portion is relatively greater than the outer core portion 32, the cross-sectional area of at least that portion can be reduced. Therefore, the reactor 1 in which the saturation magnetic flux density of the inner core portion 31 is high can be reduced in size (i.e., the volume can be reduced). The saturation magnetic flux density of the inner core portion 31 at least at the portion covered by the coil 2 is preferably 1.8 T or more, and further preferably 2 T or more; preferably 1.5 times or more as great as the saturation magnetic flux density of the outer core portion 32, and further preferably 1.8 times or more as great as that, without the upper limit for each case. Note that, when the powder magnetic core as the material of the inner core portion 31 is replaced by a lamination product of electromagnetic steel sheets represented by silicon steel plates, the saturation magnetic flux density of the inner core portion 31 can be further enhanced with ease.

Here, it is preferable that the saturation magnetic flux density of the outer core portion 32 is 0.6 T or more. The saturation magnetic flux density of the outer core portion 32 is preferably as high as possible. It is preferably 0.8 T or more, and further preferably 1 T or more. However, here, the saturation magnetic flux density of the outer core portion 32 is defined to be less than that of the inner core portion 31.

It is preferable that the relative permeability of the outer core portion 32 is greater than 1 and 20 or less. Here, the relative permeability of the outer core portion 32 is preferably 5 to 20, 5 to 18, and further preferably 5 to 15. The relative permeability of the outer core portion 32 being lower than that of the inner core portion 31 makes it easier for the magnetic flux to pass through the inner core portion 31.

The relative permeability of the whole magnetic core 3 structured by the inner core portion 31 and the outer core portion 32 having the magnetic characteristic described above is 10 to 100. Since the relative permeability of the whole magnetic core 3 is relatively low, the whole magnetic core 3 can achieve the integrated gapless structure without having any gap member such as an alumina plate or air gap interposed. It goes without saying that gaps can be interposed as appropriate at part of the magnetic core 3.

[Case]

The case 4 referred to herein is a rectangular parallelepiped box-like element structured by a quadrangular bottom face and four sidewalls provided to stand upright from the bottom face, and the face opposing to the bottom face is open. The case 4 is used as a container storing a combined product made up of the coil 2 and the magnetic core 3. The case 4 achieves protection from the environment for the coil 2 and the magnetic core 3 and mechanical protection therefor. Further, when the reactor 1 is fixed to an installation target such as a cooling table, the case 4 is used as a heat dissipation path. Accordingly, what can be suitably used as the material structuring the case 4 is a material exhibiting excellent thermal conductivity, preferably a material being higher in the thermal conductivity than a magnetic substance powder such as iron, e.g., metal such as aluminum, an aluminum alloy, magnesium, a magnesium alloy and the like. Since such aluminum, magnesium, an aluminum or magnesium alloy are lightweight, they are suitable also as the material structuring automobile components, which are desired to be lightweight. Further, since such aluminum, magnesium, aluminum or magnesium alloy are each a non-magnetic material and an electrically conductive material, leakage flux to the outside of the case 4 can be effectively prevented. Here, the case 4 is made of an aluminum alloy.

In the example shown in FIG. 1, attaching portions 41 for fixing the reactor 1 to an installation target are integrally formed at the case 4. The attaching portions 41 each have a bolt hole, and the reactor 1 can be fixed to the installation target by bolts. In addition, when the case 4 is provided with a positioning portion for positioning the coil 2 and the inner core portion 31 at a prescribed position, the coil 2 or the inner core portion 31 can be arranged at an appropriate position in the case 4. Here, the case 4 is provided with the positioning portion (not shown) such that the coil 2 is positioned at the center portion of the case 4, as shown in FIG. 1 (B). Further, when a lid made of an electrically conductive material such as aluminum similarly to the case 4 is provided, leakage flux can be avoided, and the protection from the environment for the outer core portion 32 and mechanical protection therefor can be achieved. The lid is provided with notches or through holes such that the end portions of the wire 2w structuring the coil 2 can be drawn out. Alternatively, the lid can be formed by packing a resin.

[Other Structure]

In order to enhance the insulation between the coil 2 and the magnetic core 3, the outer circumference of the coil 2 may be covered by an insulating resin, or the outer circumference of the coil 2 may be covered by an insulating member such as insulating paper, an insulating sheet, an insulating tape or the like. The insulating resin may be epoxy resin, urethane resin, polyphenylene sulfide (PPS) resin, polybutylene terephthalate (PBT) resin, acrylonitrile butadiene styrene (ABS) resin, unsaturated polyester and the like. Further, in order to enhance insulation between the inner core portion 31 and the coil 2, an insulating bobbin may be provided at the outer circumference of the inner core portion 31. The bobbin may include a sleeve-like portion provided at the outer circumference of the inner core portion 31, and annular flange portions provided at the opposite ends of the sleeve-like portion. In particular, when the bobbin is integrally structured by a combination of a plurality of divided pieces, it can be easily disposed in the inner core portion 31. The material structuring the bobbin may include PPS resin, liquid crystal polymer (LCP), polytetrafluoroethylene (PTFE) resin and the like. In addition, the outer circumference of the inner core portion 31 may be covered by an insulating tubing such as a heat shrink tubing. Further, in the situation where the coil 2 is brought into contact with the case 4, in order to enhance insulation between the coil 2 and the case 4, the insulating member noted above can be interposed. When the drawn out portions of the wire 2w being brought into contact with the magnetic core 3 are also covered by the insulating resin, the insulating member, or other heat shrink tubing noted above, insulation can be enhanced.

Alternatively, the case can be dispensed with. Dispensing with the case, a reduction in the size and weight of the reactor can be achieved. When the outer circumferential face of the magnetic core 3 is made of the composite material structuring the outer core portion 32, the magnetic core 3 may be exposed because the resin component is contained. However, when the outer circumference of the magnetic core 3 is covered by the insulating resin, the protection from the environment for the magnetic core 3 and the mechanical protection therefor can be achieved. When the insulating resin is designed to contain a filler made of ceramic or the like, which exhibits high thermal conductivity, it is preferable because an excellent heat dissipating characteristic is exhibited. The portion coated by the resin may be integrally molded with the attaching portions described above.

[Application]

The reactor 1 structured as described above can be suitably used for the application where the energizing conditions are as follows, for example: the maximum current (direct current) is approximately 100 A to 1000 A; the average voltage is approximately 100 V to 1000 V; and the working frequency is approximately 5 kHz to 100 kHz. Representatively, the reactor 1 can be suitably used as a constituent component of an in-vehicle power converter apparatus of an electric vehicle, a hybrid vehicle or the like.

[Manufacturing Method of Reactor]

Figure 2:
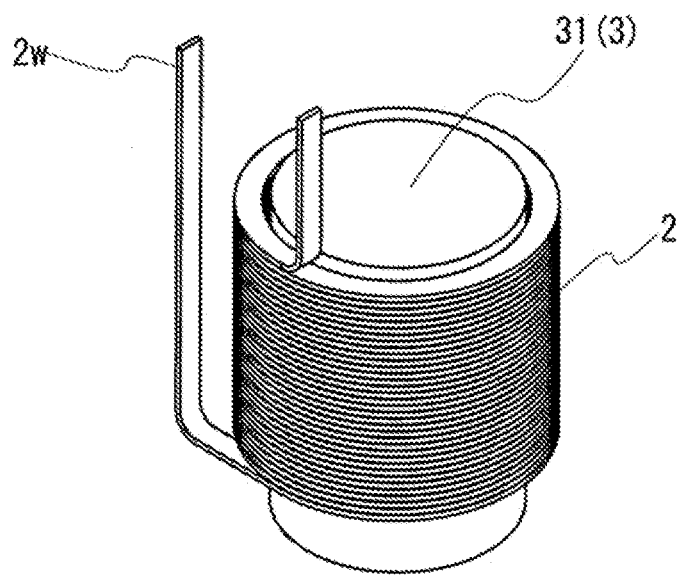
FIG. 2 is a perspective view showing an assembled product made up of a coil and an inner core portion included in the reactor according to the first embodiment.

The reactor 1 can be manufactured as follows, for example. Firstly, the coil 2 and the inner core portion 31 made of the powder magnetic core are prepared. Then, as shown in FIG. 2, the inner core portion 31 is inserted into the coil 2, to produce an assembled product made up of the coil 2 and the inner core portion 31. Then, the assembled product is stored in the case 4.

A mixture of a plurality of types of magnetic substance powders and an uncured resin for structuring the outer core portion 32 (FIG. 1) is prepared. The mixture is fully agitated such that the magnetic substance powders differing in the composition of the raw material are uniformly dispersed, and then the mixture is poured into the case 4 which serves also as a mold assembly. Here, by setting the total content of the magnetic substance powder in the mixture to be 70 volume percent or less, the mixture possesses excellent flowability. Thus, the mixture can be fully packed in the case 4 having a complicated space because of the presence of the coil 2 and the inner core portion 31. After the packing process, the resin in the mixture is cured. Thus, the outer core portion 32 made of the composite material can be formed. Further, here, as shown in FIG. 1 (B), by the outer core portion 32 being formed so as to be brought into contact with the one end face of the inner core portion 31 and the outer circumferential face on the other end face side of the inner core portion 31, the magnetic core 3 that forms a closed magnetic path upon excitation of the coil 2 can be formed. Accordingly, the reactor 1 (FIG. 1) can be obtained simultaneously with the formation of the outer core portion 32.

[Effect]

The magnetic substance powder in the composite material structuring part of (here, the outer core portion 32) the magnetic core 3 is structured by the mixed powder made up of a plurality of types of materials differing in the relative permeability. Since the magnetic substance powder contains the powders differing in the material, the composite material achieves both the high saturation magnetic flux density and the low-loss characteristic.

Since the reactor 1 includes the outer core portion 32 made of the composite material made up of the magnetic substance powder of the particular compositions and the resin, the reactor 1 has the high saturation magnetic flux density and the low-loss characteristic. In particular, with the reactor 1, since the inner core portion 31 is made of the powder magnetic core, the saturation magnetic flux density of the inner core portion 31 is also high. Therefore, the saturation magnetic flux density of the whole magnetic core 3 (the value obtained by averaging the saturation magnetic flux density of the magnetic core 3) is higher than a magnetic core being entirely structured by the composite material.

Further, by employing the composite material containing magnetic substance powders differing from each other also in the particle size in addition to the difference in the material, a further improvement in the saturation magnetic flux density, or an achievement of the low-loss characteristic by a further reduction in the eddy current loss can be achieved. In addition, the following effects can be achieved with the mode in which the composite material contains the fine-and-coarse particle mixed powder.

(1) The magnetic substance powder can be handled with ease during manufacture, and hence excellent manufacturability is exhibited.

(2) Without the necessity of excessively increasing the amount of the magnetic substance powders, the mixture of the magnetic substance powder and the resin exhibits excellent flowability during manufacture because the proportion of the magnetic component of the composite material is high to some degree. From this point also, excellent manufacturability is exhibited.

(3) Since the mixture exhibits excellent flowability, even a composite material (here, the outer core portion 32) of a complicated shape can be formed highly precisely.

Furthermore, with the reactor 1, since the outer core portion 32 is made of the composite material, the following effects can be obtained: (1) the magnetic characteristic can be changed with ease; (2) since the resin component is contained, by allowing the coil 2 and the inner core portion 31 to be covered by the resin, they can be protected from the environment and can be mechanically protected; (3) the resin component can be used as a member for joining the outer core portion 32 to the inner core portion 31; and (4) the reactor 1 can be formed simultaneously with formation of the outer core portion 32, and hence excellent manufacturability is exhibited.

In addition, in connection with the reactor 1, since the saturation magnetic flux density of the inner core portion 31 is higher than the outer core portion 32, in the situation where a magnetic flux being identical to a core made of a single material (a core in which the saturation magnetic flux density of the whole core is uniform) is to be obtained, the cross-sectional area (the area of the portion through which the magnetic flux passes) of the inner core portion 31 (particularly the portion being covered by the coil 2) can be reduced. Since the inner core portion 31 is reduced in size, the size of the coil 2 can also be reduced. Further, since the reactor 1 has the gapless structure, the coil 2 and the inner core portion 31 can be disposed closely to each other. Thanks to the foregoing points, the reactor 1 is small in size. Since the coil 2 is reduced in size, a reduction in weight of the reactor 1 can also be achieved. Further, since the reactor 1 has the gapless structure, the joining process of the gap member can be dispensed with. From this point also, excellent manufacturability is exhibited.

TEST EXAMPLE 1

A composite material containing a magnetic substance powder and a resin was produced. The magnetic characteristic of the obtained composite material was examined.

As the raw-material magnetic substance powder, a pure iron powder (99.5 mass percent or more Fe), an Fe—Si alloy powder (6.5 mass percent Si, the rest being Fe and inevitable impurities) were prepared. Further, as the resin serving as the binder, epoxy resin was used for every sample.

(Sample Nos. 1-1 to 1-3, 1-100, 1-200: Pure Iron Powder<Iron Alloy Powder)

In producing composite materials of Sample Nos. 1-1 to 1-3, 1-100, 1-200, as the pure iron powder (here, a coated powder having an insulating coat made of phosphate) and the Fe—Si alloy powder (here, a powder with no insulating coat), powders differing in the particle size are prepared. The particle size distribution of each powder was examined using a commercially available apparatus (Microtrac particle size distribution analyzer MT3300, available from NIKKISO CO., LTD.), which employs laser diffraction and scattering. In the histogram of the obtained particle size distribution, in connection with the pure iron powder, the mode was 54 μm, and the high-frequency particle size was 48 μm to 57 μm, whereas in connection with the Fe—Si alloy powder, the mode was 141 μm and the high-frequency particle size was 125 μm to 176 μm. Note that, since the thickness of the insulating coat is approximately 0.1 μm or less and extremely thin, it substantially does not influence the particle size of the coated powder. Therefore, the particle size of the coated powder is regarded as the particle size of the magnetic substance powder. The pure iron powder, the Fe—Si alloy powder, and the resin (contained by 50 volume percent in the composite material) were prepared such that the content of each powder relative to the whole composite material became the amount shown in Table 1 (volume percent), and such that the composite material of the size being great enough to produce the sample, whose description will follow, was obtained. Note that, as a result of examining the circularity (maximum diameter/equivalent circle diameter) using the microscopic observation image of the cross section for each powder in the manner described above (in which the number of measured particles was 1000 or more), the circularity of the pure iron powder was 1.9 and the circularity of the Fe—Si alloy powder was 1.1.

(Sample Nos. 1-11, 1-12, 1-110, 1-210: Iron Alloy Powder<Pure Iron Powder)

In producing composite materials of Sample Nos. 1-11, 1-12, 1-110, 1-210, as the pure iron powder and the Fe—Si alloy powder, powders differing in the particle size from Sample No. 1-1 and others (here, each being a powder with no insulating coat) were prepared. The particle size distribution and circularity of each powder were examined in the manner being similar to Sample No. 1-1 and others. In connection with the pure iron powder, the mode was 65 μm and the high-frequency particle size was 62 μm to 74 μm, with the circularity of 1.5, whereas in connection with the Fe—Si alloy powder, the mode was 30 μm, and the high-frequency particle size was 26 μm to 34 μm, with the circularity of 1.4. The pure iron powder, the Fe—Si alloy powder, and the resin (contained by 50 volume percent in the composite material) were prepared such that the content of each powder relative to the whole composite material became the amount shown in Table 2 (volume percent), and such that the composite material of the size being similar to Sample No. 1-1 and others was obtained.

A mixture was produced by mixing the prepared magnetic substance powder and resin. The mixture was packed into a mold assembly of a prescribed shape. Thereafter, the resin was cured to obtain a composite material. Here, a ring-like sample having an outer diameter of φ34 mm, an inner diameter of φ20 mm, and a thickness of 5 mm, was produced as the sample for measuring the magnetic characteristic. Further, a disc-like sample, whose diameter was φ50 mm and thickness was 5 mm, was produced as the sample for measuring the heat dissipating characteristic.

For each of the obtained composite materials, the saturation magnetic flux density, the relative permeability, and the iron loss were measured. The saturation magnetic flux density should be the one obtained by applying a magnetic field of 10000 (Oe) (=795.8 kA/m) to the ring-like composite material through use of an electromagnet, such that the composite material is fully magnetically saturated. The relative permeability was measured in the following manner. To each of the ring-like composite materials, a wire was wound by 300 turns on the primary side and 20 turns on the secondary side. The B-H initial magnetization curve was measured in the range of H=0 (Oe) to 100 (Oe). The B/H maximum value of the B-H initial magnetization curve was obtained, which maximum value was determined as the relative permeability μ. Note that, the magnetization curve herein refers to a so-called DC magnetization curve. The iron loss was measured in the following manner, using a ring-like composite material. Using a BH curve tracer, the hysteresis loss Wh (W/cm$^3$) and the eddy current loss We (W/cm$^3$) with the exciting magnetic flux density Bm of 1 kG (=0.1 T) and the measuring frequency of 10 kHz were measured, and iron loss (W/cm$^3$) was calculated based on the hysteresis loss Wh+the eddy current loss We. In addition, the thermal conductivity of the obtained disc-like composite materials was measured by the temperature gradient method. The results are shown in Tables 1 and 2.

From the obtained composite materials of Sample Nos. 1-1 to 1-3, 1-11, and 1-12, the resin component was removed to extract the magnetic substance powder. The particle size analysis for the obtained magnetic substance powder was carried out in the similar manner as described above using laser diffraction and scattering. In the histogram, Sample Nos. 1-1 to 1-3 had the peak at each of the points of 54 μm and 141 μm, whereas Sample Nos. 1-11 and 1-12 had the peak at each of the points of 30 μm and 65 μm. That is, a plurality of peaks are present in the particle size distribution of the magnetic substance powder in each composite material, substantially maintaining the particle size distribution of the powder used as the raw material.

TABLE 1

| Sample No. | Content of Magnetic Substance Powder (Volume Percent) | | Saturation Magnetic Flux Density [T] | Relative Permeability μ | Iron Loss (W1/10k) [W/cm$^3$] | Thermal Conductivity [W/mK] |
|---|---|---|---|---|---|---|
| | Fe (54) | Fe (141) | | | | |
| 1-100 | 50 | 0 | 0.99 | 11.9 | 370 | 1.8 |
| 1-1 | 33 | 17 | 0.99 | 12.3 | 333 | 2.0 |
| 1-2 | 27 | 23 | 0.97 | 12.4 | 323 | 1.9 |
| 1-3 | 20 | 30 | 0.96 | 12.2 | 313 | 1.9 |
| 1-200 | 0 | 50 | 0.95 | 10.9 | 260 | 1.8 |

TABLE 2

| Sample No. | Content of Magnetic Substance Powder (Volume Percent) | | Saturation Magnetic Flux Density [T] | Relative Permeability μ | Iron Loss (W1/10k) [W/cm$^3$] | Thermal Conductivity [W/mK] |
|---|---|---|---|---|---|---|
| | Fe-6 (65) | Fe—6.5Si (30) | | | | |
| 1-110 | 50 | 0 | 1.05 | 11.6 | 486 | 2.0 |
| 1-11 | 30 | 20 | 0.98 | 12.0 | 427 | 2.0 |
| 1-12 | 20 | 30 | 0.95 | 12.0 | 402 | 1.9 |
| 1-210 | 0 | 50 | 0.88 | 12.7 | 355 | 1.8 |

As shown in Tables 1 and 2, it can be seen that the composite material of Sample Nos. 1-1 to 1-3, 1-11, and 1-12 each containing a plurality of magnetic substance powders differing in the relative permeability have both the high saturation magnetic flux density and the low-loss characteristic, as compared to Sample Nos. 1-100, 1-110, 1-200, and 1-210 each containing the magnetic substance powder made of a single material. In particular, Sample No. 1-1 containing a plurality of magnetic substance powders differing in the relative permeability has the saturation magnetic flux density substantially equivalent to that of Sample No. 1-100 containing only the fine pure iron powder, while the loss thereof is lower than that of Sample No. 1-100. Though the reason for the resultant high saturation magnetic flux density of Sample No. 1-1 is unclear, it is assumed that a change is caused in the demagnetizing coefficient by Sample No. 1-1 containing a plurality of types of magnetic substance powders and by both the fine powder and the coarse powder being present. Further, from the test, it can be seen that: when the pure iron powder is greater than the iron alloy powder (preferably, the greatest), the saturation magnetic flux density becomes higher; when the pure iron powder shows the peak with the minimum particle size, the loss can be reduced; when the coated powder provided with the insulating coat is contained, the loss can be reduced; when the iron alloy powder is greater than the pure iron powder in the proportion, the loss can be reduced; and use of the raw-material powder whose circularity approximating 1.0 can achieve a low-loss characteristic and a relatively small relative permeability with ease.

Note that, in the present test example, though both the pure iron powder and the iron alloy powder are contained, a similar result can be obtained with iron alloy powders differing in the composition. In particular, use of the iron alloy powders differing in the composition can further reduce the iron loss.

(Second Embodiment)

In the first embodiment, part of the magnetic core is made of the composite material made up of the magnetic substance powder and the resin. However, it is also possible to employ the mode in which at least part of the magnetic core is made of a composite material made up of the magnetic substance powder, a non-magnetic substance powder, and the resin. The non-magnetic substance powder may function to suppress precipitation of the magnetic substance powder in manufacturing the composite material.

In order to fully achieve the effect of suppressing precipitation, the non-magnetic substance powder is preferably smaller than the magnetic substance powder in specific gravity. Such materials may be ceramic such as $SiO_2$, $Al_2O_3$, $Fe_2O_3$, BN, AlN, ZnO, and $TiO_2$, and inorganic materials such as silicon (Si), organic materials such as silicone resin. In particular, $SiO_2$ (silica) is capable of providing the resin with the thixotropy characteristic, and suppresses precipitation of the magnetic substance powder with ease. When the composite material contains the non-magnetic substance powder containing a material exhibiting high thermal conductivity, such as $SiO_2$, $Al_2O_3$, BN, or AlN, the heat dissipating performance of the composite material can be enhanced. Accordingly, use of such a composite material can provide a reactor-use core or a reactor exhibiting an excellent heat dissipating characteristic. When a powder made of silicone resin is contained, an occurrence of cracks in the composite material can be suppressed. Accordingly, use of such a composite material can provide a reactor-use core or a reactor of high strength. The composite material may contain the non-magnetic substance powder made of one type of material, or the composite material may contain the non-magnetic substance powder made of a plurality of different types of materials.

The shape of the particles structuring the non-magnetic substance powder may be spherical, non-spherical (e.g., plate-like, needle-like, rod-like and the like) and the like. In particular, the spherical shape provides the following effects: the particles are easily packed in the clearance formed among the magnetic substance particles; and excellent flowability is achieved. Further, the non-magnetic substance particle may be a solid element or a hollow element. The hollow element can achieve a reduction in weight of the composite material. As the non-magnetic substance powder, any commercially available powder can be used. The composite material may contain the non-magnetic substance powder made of particles in one shape, or the composite material may contain the non-magnetic substance powder made of particles in a plurality of different shapes.

Then, obtaining the particle size distribution of the mixed powder, which is present in the composite material and which is made up of the non-magnetic substance powder and the magnetic substance powder, it is preferable that the maximum particle size $r_n\max$ with which a peak of the non-magnetic substance powder appears is smaller than the minimum particle size $r_m\min$ with which a peak of the magnetic substance powder appears. In this mode, the magnetic substance particles being greater than the non-magnetic substance particles in the particle size are present at high frequencies. Accordingly, fine non-magnetic substance particles can be present in the clearance formed among the magnetic substance particles. Therefore, a reduction in the packing density of the magnetic substance powder associated with the non-magnetic substance powder being contained will not occur easily, or substantially will not occur. As the difference in the particle size between the magnetic substance particles and the non-magnetic substance particles is greater, the foregoing effect can be obtained with ease. Therefore, it is preferable that at least one of the following relationships is satisfied: $r_n\max \leq (1/3) \times r_m\min$, and $r_n\max$ 20 μm. As the non-magnetic substance powder is smaller, the clearance can be efficiently filled. Additionally, the non-magnetic substance particles can easily surround the magnetic substance particles uniformly. Further, since the fine non-magnetic substance particles are present among the magnetic substance particles, the relative permeability of the composite material can be suppressed to a low value. Accordingly, the following relationships are more preferable: $r_n\max \leq (1/5) \times r_m\min$, and $r_n\max$ 10 μm. For example, a fine non-magnetic substance powder whose particle size is approximately 1 μm to 10 μm or less than 1 μm can be used. The specific mode may be a composite material in which the particle size $r_1$ representing the first peak of the magnetic substance powder, the particle size $r_2$ representing the second peak, and the particle size $r_n$ representing the peak of the non-magnetic substance powder in the particle size distribution of the mixed powder satisfy the relationships $r_2=2r_1$ and $r_n=(1/3) \times r_1$. The composite material may contain the non-magnetic substance powder with one particle size (that is, the peak of the non-magnetic substance powder is one), or the composite material may contain the non-magnetic substance powder with a plurality of different particle sizes (that is, a plurality of peaks of the non-magnetic substance powder are present). In the latter case, both the magnetic substance powder and the non-magnetic substance powder may have a plurality of peaks.

When the content of the non-magnetic substance powder is 0.2 mass percent or more relative to the whole composite material, it can fully surround the magnetic substance powder, to effectively suppress precipitation of the magnetic substance powder. In the case where the non-magnetic substance powder is made of a material exhibiting excellent thermal conductivity, when it is contained by 0.2 mass percent or more, the non-magnetic substance powder are adequately present. Therefore, the heat dissipating performance of the composite material can be further improved. In addition, since the non-magnetic substance powder is present uniformly as described above, the composite material is provided with a uniform heat dissipating characteristic. Such effects are greater as the amount of the non-magnetic substance powder is greater. Therefore, the total content of the non-magnetic substance powder relative to the whole composite material is preferably 0.3 mass percent or more, and further preferably 0.5 mass percent or more. However, when the amount of the non-magnetic substance powder is excessively great, a reduction in the proportion of the magnetic component is invited. Therefore, the total content of the non-magnetic substance powder is preferably 20 mass percent or less, further preferably 15 mass percent or less, and particularly preferably 10 mass percent or less.

The composite material containing the non-magnetic substance particle can effectively prevent the magnetic substance powder from precipitating in the uncured resin during manufacture. Further, it facilitates uniform dispersion of the magnetic substance particles in the resin. Since precipitation of the magnetic substance powder is suppressed, the mixture made up of the magnetic substance powder, the non-magnetic substance powder, and the resin exhibits excellent flowability, and can be fully packed in the mold assembly (the case 4 in the first embodiment). Accordingly, the composite material can be manufactured highly precisely even when it has a complicated shape. Further, by curing the resin in the state where the magnetic substance powder is uniformly dispersed, the composite material in which the magnetic substance powder and the non-magnetic substance powder are uniformly dispersed can be obtained. Accordingly, with the composite material, the portion where the magnetic substance powder is locally present to incur a high loss is hardly produced. As a result, the loss for the whole composite material can also be reduced. Further, since the composite material in its entirety exhibits the uniform magnetic characteristic and the thermal characteristic described above, the composite material is highly reliable.

TEST EXAMPLE 2

A composite material containing a magnetic substance powder, a resin, and a non-magnetic substance powder was produced. The magnetic characteristic of the obtained composite material was examined.

As the raw-material magnetic substance powder for this test, the powders being identical to Sample No. 1-2 of Test Example 1 (the pure iron powder (coated powder) having the mode of 54 μm and the circularity of 1.9, and the Fe—Si alloy powder (with no coat) having the mode of 141 μm and the circularity of 1.1) and the resin being identical to Test Example 1 were prepared. Further, a non-magnetic substance powder being a silica filler (whose particle size is 5 nm to 50 nm and particle size is 12 nm≤20 μm) was prepared. The non-magnetic substance powder was prepared such that the content relative to the whole composite material became 0.3 mass percent (≥0.2 mass percent).

A mixture was produced by mixing the prepared magnetic substance powder, the resin, and the non-magnetic substance powder. In the similar manner as in Test Example 1, a composite material was obtained from the mixture (Sample No. 2-2). As to the obtained composite material, the saturation magnetic flux density, the iron loss, the thermal conductivity, and the relative permeability were measured in the similar manner as in Test Example 1. The result is shown in Table 3. Further, as to the obtained composite material of Sample No. 2-2, the particle size distribution in the composite material was examined by removing the resin component in the similar manner as in Test Example 1. The peak was present at each of the points of 12 nm, 54 μm, and 141 μm. The minimum particle size with which a peak appears is the non-magnetic substance powder.

An elongated columnar sample (having a length of 60 mm) was produced from the mixture. A sample piece including one end face (the face having been in contact with the bottom face of the mold assembly) of the sample and a sample piece including other end face (top face) disposed to oppose to the one end face were cut out therefrom. The density of each of the sample pieces was obtained, to examine the difference between them (maximum density difference). The result is also shown in Table 3. The density difference (%) is defined as: {(the density of the sample piece on the bottom face side–the density of the sample piece on the top face side)/the density of the sample piece on the bottom face side}×100. The density was obtained by using Archimedes' principle, and approximating the relationship: water density>>air density, and derived by: density $\rho \approx$ (the water density×the mass in the air)/(the mass in the air–the mass in water).

TABLE 3

| Sample No. | Content of Magnetic Substance Powder (Volume Percent) | | Saturation Magnetic Flux Density [T] | Relative Permeability μ | Iron Loss (W1/10k) [W/cm³] | Thermal Conductivity [W/mK] | Maximum Density Difference (%) |
|---|---|---|---|---|---|---|---|
| | Fe (54) | Fe—6.5Si (141) | | | | | |
| 1-2 | 27 | 23 | 0.97 | 12.4 | 323 | 1.9 | 5.2 |
| 2-2 | 27 | 23 | 0.96 | 11.6 | 306 | 1.9 | 2.4 |

As shown in Table 3, since the non-magnetic substance powder is contained, it can be seen that the composite material with a small density difference can be obtained also in the case where the sample is in an elongated shape. It is assumed that the reason therefor is the presence of the non-magnetic substance powder, which suppressed precipitation of the magnetic substance powder during manufacture of the composite material. Further, it can be seen that Sample No. 2-2 containing the non-magnetic substance powder has a further low-loss characteristic and has a small relative permeability. It is assumed that the reason therefor is that the magnetic substance powder and the non-magnetic substance powder were uniformly present in the composite material, while substantially no portion where the magnetic substance powder was locally present by a great amount was present.

(Third Embodiment)

In the first embodiment, only part of the magnetic core is made of the composite material of the present invention. However, it is also possible to employ the mode in which the entire magnetic core is made of the composite material of the present invention, that is, the mode in which the inside and outside of the coil 2 is covered by the composite material of the present invention. The reactor according to this mode can be manufactured by, for example, disposing the coil 2 at an appropriate position in the case 4 described in the first embodiment, packing the mixture containing the magnetic substance powder and the resin in the case 4, and thereafter curing the resin. Hence, excellent productivity is exhibited. Since the whole magnetic core is made of the composite material of the present invention, the reactor has a uniform saturation magnetic flux density and relative permeability. Further, the magnetic core can be in the gapless structure when a relatively low permeability is set. In this case, as described above, a reduction in the size and weight can be achieved.

Alternatively, as the inner core portion described in the first embodiment, a columnar molded product being separately produced using the composite material of the present invention may be used. In this case, by preparing the raw-material magnetic substance powder such that the composition of the magnetic substance powder used for the inner core portion and the composition of the magnetic substance powder used for the outer core portion differ from each other, the mode in which the magnetic characteristic of the magnetic core is partially different can be implemented. For example, similarly to the first embodiment, the mode in which the saturation magnetic flux density of the inner core portion is higher than that of the outer core portion can be implemented.

Alternatively, contrary to the structure of the first embodiment, it is possible to employ the mode in which the columnar molded product made of the composite material is used as the inner core portion and the outer core portion is made of the powder magnetic core. The outer core portion includes, for example, a sleeve-like portion disposed on the outer circumference of the coil and a plate-like portion disposed at each end face of the coil. In this manner, the permeability of the inner core portion containing the resin component can be set to be lower than that of the outer core portion, and the saturation magnetic flux density of the outer core portion made of the powder magnetic core can be set to be higher than that of the inner core portion. With this structure, the leakage flux from the outer core portion to the outside can be reduced, and the loss attributed to such a leakage flux can be reduced.

(Fourth Embodiment)

Though the upright mode is employed in the first embodiment, the mode in which the coil 2 is stored such that the axial direction of the coil is in parallel to the bottom face of the case 4 (hereinafter, referred to as lateral) may be employed. Since the lateral mode shortens the distance from the outer circumferential face of the coil to the bottom face of the case, the heat dissipating performance can be enhanced.

(Fifth Embodiment)

Figure 3:
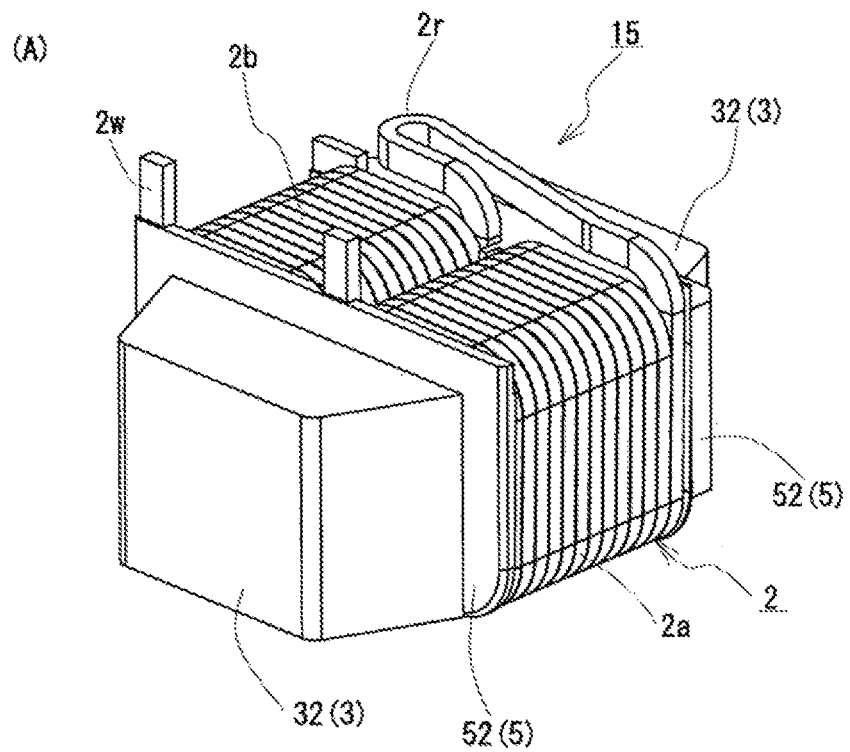
FIG. 3 (A) is a schematic perspective view of a reactor according to a fifth embodiment, and FIG. 3 (B) is a schematic perspective view of a magnetic core included in the reactor.
Figure 3:
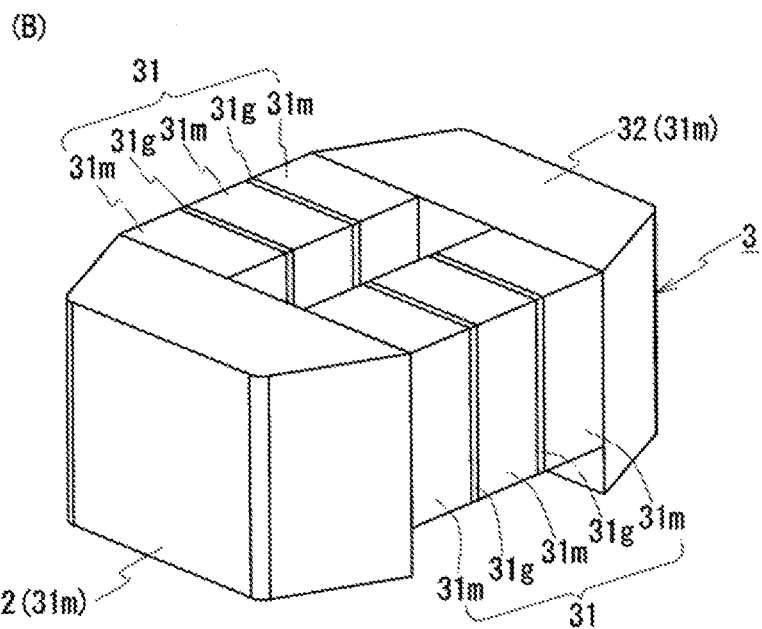

Though a single coil is included in the first embodiment, it is possible to employ the mode including, as a reactor 15 shown in FIG. 3 (A), a coil 2 having a pair of coil elements 2a and 2b formed by a single continuous wire 2w spirally wound, and an annular magnetic core 3 (FIG. 3 (B)) where the coil elements 2a and 2b are disposed.

In the representative mode of the coil 2, the coil elements 2a and 2b are laterally juxtaposed with each other such that the axial directions of the coil elements 2a and 2b are in parallel to each other, and the coil elements 2a and 2b are coupled to each other by a couple portion 2r formed by a portion of the wire 2w being folded back. In addition, the mode in which the coil elements 2a and 2b are separately formed by two different wires, and one end portions of the wires respectively structuring the coil elements 2a and 2b are joined by welding, fixation under pressure, soldering or the like, such that the coil elements 2a and 2b are integrated. The coil elements 2a and 2b are identical to each other in the number of turns and in the winding direction. The coil elements 2a and 2b are formed to be hollow sleeve-like.

The magnetic core 3 includes a pair of columnar inner core portions 31 and 31 respectively disposed inside the coil elements 2a and 2b, and a pair of columnar outer core portions 32 and 32 disposed outside the coil 2 and exposed outside the coil 2. As shown in FIG. 3 (B), in connection with the magnetic core 3, one end faces of the inner core portions 31 and 31 disposed to be away from each other are coupled to each other via one outer core portion 32, and other end faces of the inner core portions 31 and 31 are coupled to each other via other outer core portion 32, so as to form an annular shape.

In addition, the reactor 15 includes an insulator 5 for enhancing insulation between the coil 2 and the magnetic core 3. The insulator 5 includes a sleeve-like portion (not shown) disposed at the outer circumference of the columnar inner core portions 31, and a pair of frame plate portions 52 that are arranged to abut on the end face (the face where the turn appears annular) of the coil 2 and that have two through holes (not shown) into which the inner core portions 31 and 31 are inserted. As the material structuring the insulator 5, an insulating material such as PPS resin, PTFE resin, LCP or the like may be used.

More specific mode of the reactor 15 including the coil 2 may be, for example, an inner powder magnetic core mode (that is, part of the magnetic core is made of the composite material of the present invention), including; the inner core portions 31 and 31 that are respectively inserted into the coil elements 2a and 2b and that are each made of the powder magnetic core; and the outer core portions 32 and 32 structured by columnar molded products each made of the composite material of the present invention. Another inner powder magnetic core mode may be the mode in which an assembled product made up of the coil elements 2a and 2b and the powder magnetic core is covered by the composite material of the present invention as in the first embodiment. Alternatively, still another mode may be an outer powder magnetic core mode (that is, part of the magnetic core is made of the composite material of the present invention), including: the inner core portions 31 and 31 that are respectively inserted into the coil elements 2a and 2b and that are each structured by the columnar molded product made of the composite material of the present invention; and the outer core portions 32 and 32 each structured by the powder magnetic core. Alternatively, still another mode may be the mode in which the magnetic core disposed inside and outside the coil elements 2a and 2b is made of the composite material of the present invention (that is, the entire magnetic core is made of the composite material of the present invention, which is hereinafter referred to as the entire composite material mode). In any of the three modes, the inner core portions 31 may be in the mode where they are made of solely the magnetic material such as the composite material or the powder magnetic core, or may be in the mode where they are, as shown in FIG. 3 (B), made of a lamination product, which is structured by core pieces 31m made of the magnetic material and gap members 31g made of a material whose permeability is lower than the core pieces 31m (representatively, the non-magnetic material) being alternately stacked. The outer core portions 32 may be in the mode where they are structured by the core pieces 31m made of the magnetic material.

The inner powder magnetic core mode can easily increase the saturation magnetic flux density of the inner core portions 31 and 31, which are made of the powder magnetic cores respectively inserted into the coil elements 2a and 2b, than that of the outer core portions 32 made of the composite material including resin. Since the saturation magnetic flux density of the inner core portions 31 is high, the cross section of each inner core portion 31 can be reduced. With a reduction in the size of the inner core portions 31, the inner powder magnetic core mode can achieve (1) a reduction in the size of the reactor, (2) a reduction in the weight of the reactor by a reduction in the length of the wire 2w, and the like. Since the outer powder magnetic core mode can easily increase the saturation magnetic flux density of the outer core portions 32 disposed outside the coil elements 2a and 2b to be higher than that of the inner core portions 31, the leakage flux from the outer core portions to the outside can be reduced. Accordingly, with the outer powder magnetic core mode, the loss associated with any leakage flux can be reduced, and the magnetic flux formed by the coil 2 can be fully used. With the entire composite material mode, in the case where the entire magnetic core 3 is made of an identical material, the magnetic core can be manufactured with ease even when the magnetic core is made up of a plurality of core pieces, not to mention when the magnetic core is made of one molded product. Hence, excellent productivity is exhibited. In particular, when the case is used as a mold assembly as in the first embodiment, the magnetic core 3 can be formed with ease even when the magnetic core 3 is in a complicated shape. Further, in the entire composite material mode, forming the composite material of a relatively low permeability by adjusting the material or content of the magnetic substance powder, the gapless structure can be achieved. Thus, any leakage flux from the gap portion cannot occur. Furthermore, an increase in the size of the reactor associated with the gap can be suppressed. Alternatively, by varying the material or content of the magnetic substance powder in the core pieces, as in the inner powder magnetic core mode or in the outer powder magnetic core mode, the magnetic characteristic of the magnetic core can be partially changed also in the entire composite material mode. Further, employing the mode in which the inside and outside of the coil are covered by the composite material, the coil can be covered by the resin component of the composite material.

(Sixth Embodiment)

The reactor according to any of the first to fifth embodiments may be used, for example, as a constituent component of a converter mounted on a vehicle or the like, or as a constituent component of a power converter apparatus including the converter.

Figure 4:
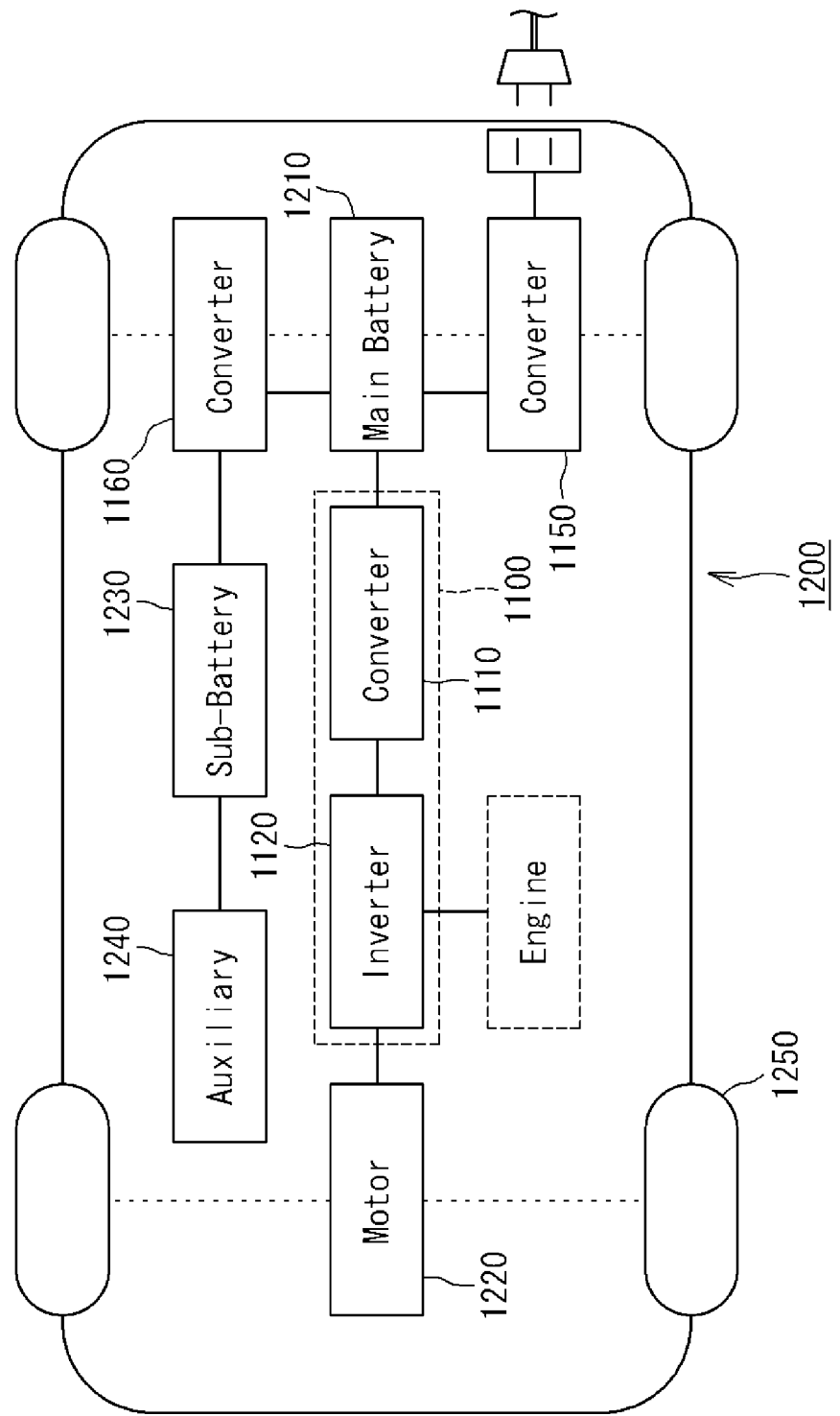
FIG. 4 is a schematic configuration diagram schematically showing a power supply system of a hybrid vehicle.

For example, as shown in FIG. 4, a vehicle 1200 such as a hybrid vehicle or an electric vehicle includes a main battery 1210, a power converter apparatus 1100 connected to the main battery 1210, and a motor (a load) 1220 driven by power supplied from the main battery 1210 and serves for traveling. The motor 1220 is representatively a three-phase alternating current motor. The motor 1220 drives wheels 1250 in the traveling mode and functions as a generator in the regenerative mode. In the case of a hybrid vehicle, the vehicle 1200 includes an engine in addition to the motor 1220. Though an inlet is shown as a charging portion of the vehicle 1200 in FIG. 4, a plug may be included.

The power converter apparatus 1100 includes a converter 1110 connected to the main battery 1210, and an inverter 1120 connected to the converter 1110 to perform interconversion between direct current and alternating current. When the vehicle 1200 is in the traveling mode, the converter 1110 shown in this example steps up a DC voltage (input voltage) of about 200 V to 300 V of the main battery 1210 to about 400 V to 700 V, and supplies the inverter 1120 with the stepped up power. Further, in the regenerative mode, the converter 1110 steps down the DC voltage (the input voltage) output from the motor 1220 through the inverter 1120 to a DC voltage suitable for the main battery 1210, such that the main battery 1210 is charged with the DC voltage. When the vehicle 1200 is in the traveling mode, the inverter 1120 converts the direct current stepped up by the converter 1110 to a prescribed alternating current and supplies the motor 1220 with the alternating current. In the regenerative mode, the inverter 1120 converts the AC output from the motor 1220 into direct current, and outputs the direct current to the converter 1110.

Figure 5:
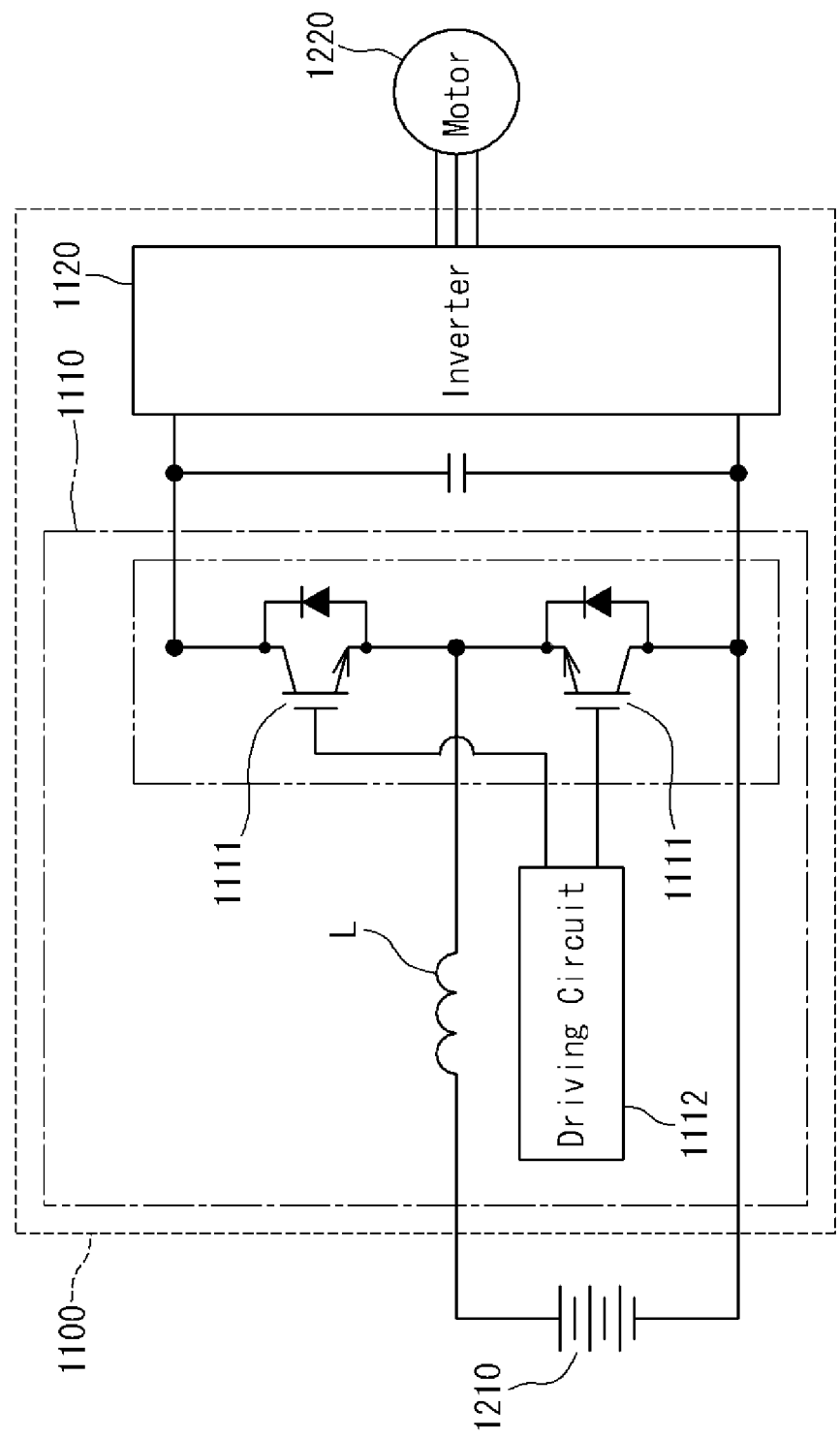
FIG. 5 is a schematic circuit diagram showing an exemplary power converter apparatus of the present invention including the converter of the present invention.

As shown in FIG. 5, the converter 1110 includes a plurality of switching elements 1111, a driver circuit 1112 that controls operations of the switching elements 1111, and a reactor L. The converter 1110 converts (here, performs step up and down) the input voltage by repetitively performing ON/OFF (switching operations). As the switching elements 1111, power devices such as FETs, IGBTs are used. The reactor L uses a characteristic of a coil that disturbs a change of current which flows through the circuit, and hence has a function of making the change smooth when the current is increased or decreased by the switching operation. The reactor L is the reactor according to any of the first to fifth embodiments. Since the reactor 1 and others with a high magnetic flux density and having a low-loss characteristic are included, the power converter apparatus 1100 and the converter 1110 have a low-loss characteristic.

Note that the vehicle 1200 includes, in addition to the converter 1110, a power supply apparatus-use converter 1150 connected to the main battery 1210, and an auxiliary power supply-use converter 1160 connected to a sub-battery 1230 serving as a power source of auxiliary equipment 1240 and to the main battery 1210, to convert a high voltage of the main battery 1210 to a low voltage. The converter 1110 representatively performs DC-DC conversion, whereas the power supply apparatus-use converter 1150 and the auxiliary power supply-use converter 1160 perform AC-DC conversion. Some types of the power supply apparatus-use converter 1150 perform DC-DC conversion. The power supply apparatus-use converter 1150 and the auxiliary power supply-use converter 1160 each may be structured similarly to the reactor according to any of the first to fifth embodiments, and the size and shape of the reactor may be changed as appropriate. Further, the reactor according to any of the first to fifth embodiments may be used as a converter that performs conversion for the input power and that performs only stepping up or stepping down.

Note that the present invention is not limited to the embodiments described above, and any change can be made within a range not departing from the gist of the present invention. For example, the composite material of the present invention may be used for a motor-use core or the like.

INDUSTRIAL APPLICABILITY

The composite material of the present invention can be used as the material structuring a magnetic core used as a magnetic part that includes a coil, such as a reactor or a motor. The reactor of the present invention can be used as a constituent component of a power converter apparatus, such as a bidirectional DC-DC converter mounted on a vehicle such as a hybrid vehicle, a plug-in hybrid vehicle, an electric vehicle, a fuel cell vehicle and the like, or a converter of an air conditioner. The reactor-use core of the present invention can be used as a constituent component of such a reactor.

REFERENCE SIGNS LIST 1, 15: REACTOR
2: COIL
2w: WIRE
2a, 2b: COIL ELEMENT
2r: COUPLE PORTION
3: MAGNETIC CORE
31: INNER CORE PORTION
31m: CORE PIECE
31g: GAP MEMBER
32: OUTER CORE PORTION
4: CASE
41: ATTACHING PORTION
5: INSULATOR
52: FRAME PLATE PORTION
1100: POWER CONVERTER APPARATUS
1110: CONVERTER
1111: SWITCHING ELEMENT
1112: DRIVER CIRCUIT
L: REACTOR
1120: INVERTER
1150: POWER SUPPLY APPARATUS-USE CONVERTER
1160: AUXILIARY POWER SUPPLY-USE CONVERTER
1200: VEHICLE
1210: MAIN BATTERY

1220: MOTOR
1230: SUB-BATTERY
1240: AUXILIARY EQUIPMENT
1250: WHEELS

The invention claimed is:

1. A composite material containing a magnetic substance powder and a resin containing the powder being uniformly dispersed therein, wherein
the magnetic substance powder contains powders respectively made of a plurality of materials differing in a relative permeability,
the composite material contains a non-magnetic substance powder made of at least one type of material, and
in a particle size distribution of mixed powder made up of the magnetic substance powder and the non-magnetic substance powder, a maximum particle size with which a peak of the non-magnetic substance powder appears is smaller than a minimum particle size with which a peak of the magnetic substance powder appears.

2. The composite material according to claim 1, wherein the magnetic substance powder contains a pure iron powder.

3. The composite material according to claim 1, wherein the magnetic substance powder contains an iron alloy powder.

4. The composite material according to claim 1, wherein the magnetic substance powder contains the pure iron powder by a greatest proportion.

5. The composite material according to claim 1, wherein a plurality of peaks are present in a particle size distribution of the magnetic substance powder, and
at least two peaks out of the peaks are peaks of the powders respectively made of the materials differing in the relative permeability.

6. The composite material according to claim 1, wherein a plurality of peaks are present in a particle size distribution of the magnetic substance powder, and
a powder that shows a peak, out of the peaks, with a minimum particle size is the pure iron powder.

7. The composite material according to claim 1, wherein a plurality of peaks are present in a particle size distribution of the magnetic substance powder,
a powder that shows a peak, out of the peaks, with a minimum particle size is the iron alloy powder.

8. The composite material according to claim 1, wherein the maximum particle size with which the peak of the non-magnetic substance powder appears is ⅓ or less as great as the minimum particle size with which the peak of the magnetic substance powder appears.

9. The composite material according to claim 1, wherein a particle size with which the peak of the non-magnetic substance powder appears is 20 μm or less.

10. The composite material according to claim 1, wherein the magnetic substance powder contains a coated powder, the coated powder including magnetic substance particles and an insulating coat covering an outer circumference of each of the magnetic substance particles.

11. The composite material according to claim 1, wherein a total content of the magnetic substance powder relative to the whole composite material is 30 volume percent or more and 70 volume percent or less.

12. The composite material according to claim 1, wherein a saturation magnetic flux density of the composite material is 0.6 T or more.

13. The composite material according to claim 1, wherein a relative permeability of the composite material is 5 to 20.

14. The composite material according to claim 1, wherein a total content of the non-magnetic substance powder relative to the whole composite material is 0.2 mass percent or more.

15. The composite material according to claim 1, wherein a circularity of each particle structuring the magnetic substance powder is 1.0 or more and 2.0 or less.

\* \* \* \* \*